US011082333B1

(12) United States Patent
Lam et al.

(10) Patent No.: US 11,082,333 B1
(45) Date of Patent: Aug. 3, 2021

(54) SYSTEMS AND METHODS FOR MANAGING RESOURCES IN A SERVERLESS WORKLOAD

(71) Applicants: Cheuk Lam, Yorktown Heights, NY (US); Pallavi Debnath, New Canaan, CT (US); Enlin Xu, New York, NY (US); Endre Sara, Briarcliff Manor, NY (US)

(72) Inventors: Cheuk Lam, Yorktown Heights, NY (US); Pallavi Debnath, New Canaan, CT (US); Enlin Xu, New York, NY (US); Endre Sara, Briarcliff Manor, NY (US)

(73) Assignee: TURBONOMIC, INC., Boston, MA (US)

(*) Notice: Subject to any disclaimer, the term of this patent is extended or adjusted under 35 U.S.C. 154(b) by 33 days.

(21) Appl. No.: 16/561,263

(22) Filed: Sep. 5, 2019

(51) Int. Cl.
H04L 12/721 (2013.01)
H04L 12/707 (2013.01)
H04L 12/727 (2013.01)
H04L 12/729 (2013.01)

(52) U.S. Cl.
CPC ............ H04L 45/26 (2013.01); H04L 45/121 (2013.01); H04L 45/125 (2013.01); H04L 45/24 (2013.01); H04L 45/38 (2013.01)

(58) Field of Classification Search
CPC ..... H04L 45/26; H04L 45/121; H04L 45/125; H04L 45/24; H04L 45/38

USPC ......................................................... 370/238
See application file for complete search history.

(56) References Cited

U.S. PATENT DOCUMENTS

| 10,673,779 | B1* | 6/2020 | Mehr | H04L 43/04 |
|---|---|---|---|---|
| 2019/0384655 | A1* | 12/2019 | Krishna Singuru | G06F 8/60 |
| 2020/0007388 | A1* | 1/2020 | Johnston | H04L 45/306 |
| 2020/0120120 | A1* | 4/2020 | Cybulski | H04L 63/1491 |
| 2020/0134564 | A1* | 4/2020 | Reilly | G06F 11/3476 |
| 2020/0329114 | A1* | 10/2020 | Bahl | G06N 20/00 |
| 2020/0358719 | A1* | 11/2020 | Mestery | H04L 47/822 |
| 2020/0364360 | A1* | 11/2020 | Solow | G06F 21/629 |
| 2020/0382519 | A1* | 12/2020 | Barton | H04L 63/107 |
| 2021/0029047 | A1* | 1/2021 | Leung | H04L 47/2483 |

* cited by examiner

Primary Examiner — Christopher R Crompton
(74) Attorney, Agent, or Firm — Morgan, Lewis & Bockius LLP

(57) ABSTRACT

Various approaches for allocating resources to an application having multiple application components, with at least one executing one or more functions, in a serverless service architecture include identifying multiple routing paths, each routing path being associated with a same function service provided by one or more containers or serverless execution entities; determining traffic information on each routing path and/or a cost, a response time and/or a capacity associated with the container or serverless execution entity on each routing path; selecting one of the routing paths and its associated container or serverless execution entity; and causing a computational user of the application to access the container or serverless execution entity on the selected routing path and executing the function(s) thereon.

21 Claims, 12 Drawing Sheets

SYSTEMS AND METHODS FOR MANAGING RESOURCES IN A SERVERLESS WORKLOAD

FIELD OF THE INVENTION

The present invention relates, generally, to a serverless service architecture, and more particularly to systems and methods for managing resources in a serverless workload in the serverless service architecture.

BACKGROUND

Traditional service-oriented computer system architectures may include one or more dedicated computer servers for each application being run, and are often designed to include an excessive allocation of resources—for example, physical components such as central processing units (CPUs) and storage—order to ensure the ability to handle peak demands without excessive latency. Such resource overloading can be costly, inefficient and difficult to scale and manage.

So-called "cloud" providers offer various elements of computational infrastructure and processing capacity and services (e.g., applications, licenses, etc.) as a service via the internet. The term "cloud" connotes the arbitrary location of the physical or software resources corresponding to the offered services; these are determined by the cloud provider and may be altered to suit the provider's changing customer demands and service-level commitments, all in a manner invisible to those customers.

Cloud computing is a model that enables customers to conveniently access, on demand, a shared pool of configurable computing resources, such as networks, platforms, servers, storage, applications, and services. These resources can typically be rapidly provisioned and then released with little or no interaction with the service provider using, e.g., automated processes. The customer can be billed based on the actual resource consumption and be freed from the need to own and/or maintain the corresponding resource infrastructure. As such, cloud computing has significantly expanded the class of individuals and companies that can be competitive in their respective market segments.

Serverless computing, also known as function-as-a-service (FaaS), is a relatively new cloud-computing paradigm that allows the service provider to dynamically provision, manage and orchestrate resources for an event-driven function execution. The unit of computation in serverless computing is a function. Unlike virtual machines (VMs) and containers, functions in serverless computing are designed to be launched on demand, upon the arrival of a specific type of a request to the service provider hosting the functions; thus, functions are generally short running processes not requiring continuous server capacity. In addition, the customers typically need not specify and configure cloud instances, e.g., VMs and/or containers, to run such functions on. As a result, substantially all of the configuration and dynamic management of the resources becomes the responsibility of the cloud operator. Amazon Web Service (AWS) LAMBDA is an exemplary execution entity offering serverless computing.

Typically, serverless service providers deploy execution entities in various clusters/regions for launching and executing hosted customer functions. As a result, there may be multiple routing paths from the customer's region to the serverless execution entities for executing the functions. A need thus exists for a resource allocation and management system to select an optimal routing path (e.g., corresponding to a minimal cost) for executing the functions on behalf of customers.

SUMMARY

The present invention relates to approaches for managing and allocating resources to application functions in a serverless service architecture (e.g., a cloud-based computing system) using a management system. In various embodiments, the same or equivalent functions to be executed are copies and deployed in multiple serverless execution entities or containers in various clusters/regions. The management system can then identify multiple routing paths from the source region to the available serverless execution entities/containers capable of executing the function. In addition, the management system may acquire traffic information on each routing path and/or a characteristic (e.g., the data-transfer cost, response time or capacity) associated with the serverless execution entity/container on each routing path. Based on the acquired information, the optimal routing path (e.g., corresponding to the lowest data-transfer cost and/or quickest response time) can be selected to execute the function. In one embodiment, the serverless execution entities provide stateless function-execution services; thus, no cost is incurred if the serverless execution entities are not selected to execute the function.

In some embodiments, the management system facilitates traffic engineering for execution of the function by acquiring real-time, updated information about network traffic and/or the characteristic associated with the serverless execution entities/containers. If the updated information indicates that another routing path is preferable (e.g., having a lower data-transfer cost or shorter response time) to the currently selected routing path, the management system may cause the function and/or another function in the application to be executed on the serverless execution entities/containers on the alternative routing path.

In addition, various embodiments may facilitate traffic engineering for execution of the function (i) between the containers that are implemented in the requester's on-premises environment and the serverless execution entities that are implemented in the cloud-based environment or (ii) among the containers and the serverless execution entities that are implemented in the cloud-based environment. For example, the management system may acquire information such as the cost and/or performance characteristic associated with the containers and/or the serverless execution entities and/or the traffic information on the routing paths from the source region to the containers and the serverless execution entity. Based on the acquired information, the management system may either select the containers or the serverless execution entities to execute the function. In addition, the management system may, again, acquire real-time, updated information about the network traffic, cost and/or performance characteristic associated with the containers and/or the serverless execution entities, and based thereon determine whether to select a different system and/or a different environment to execute the function and/or another function in the application. These approaches may advantageously relieve overload on the containers without scaling out the cluster, thereby providing an economical solution to overloaded containers.

Further, various embodiments provide approaches to appropriately size one or more computational resources allocated to the serverless execution entities/containers as well as allocating the best available resources (e.g., having the lowest prices) with the desired sizes to the serverless execution entities/containers for executing the function. For example, the management system may determine and/or monitor the revenue and cost for allocating each of the computational resources to the serverless execution entities/containers, and based thereon, determine a size associated with each of the computational resources. Thus, this approach advantageously avoids unnecessary and cumulative costs resulting from oversized resources as well as long response times resulting from undersized resources. In various embodiments, the management system can identify two or more resource providers with the necessary computational resources to the serverless execution entities/containers. Based on the prices for function execution offered by the resource providers, the management system may select the best resource provider and automatically allocate the computational resources, each having the determined size, from the selected resource provider to the serverless execution entities/containers.

Additionally or alternatively, the determined/monitored revenue and/or expense may be used to (i) scale up or down the serverless execution entities/containers (e.g., by adding or removing computational resources to existing components in the serverless execution entities/containers), (ii) scale up the serverless execution entities/containers (e.g., by adding more serverless execution entities/containers), or (iii) suspend or terminate one or more of the serverless execution entities/containers. For example, when the revenue generated by a serverless execution entity/container exceeds the expense associated therewith, the management system may automatically scale up the serverless execution entity/container. In one embodiment, a return on investment (ROI) is defined as revenue divided by cost. If the ROI is larger than a predetermined threshold, the management system may scale up the serverless execution entities/containers by adding capacity. In contrast, when the revenue generated by the serverless execution entity/container is below the expense associated therewith, the management system may scale down the serverless execution entities/containers (e.g., by dedicating the associated computational resources to other tasks). For example, if the ROI is below a predetermined threshold, the management system may suspend or terminate the serverless execution entity/container.

Accordingly, in one aspect, the invention pertains to a method of allocating resources to an application including multiple application components, with at least one executing one or more functions, in a serverless service architecture. In various embodiments, the method includes (a) identifying multiple routing paths, each routing path being associated with the same function service provided by one or more containers or serverless execution entities; (b) determining traffic information on each routing path and/or a cost, a response time and/or a capacity associated with the container(s) or serverless execution entity (entities) on each routing path; (c) selecting one of the routing paths and its associated container(s) or serverless execution entity (entities) based at least in part on the determination in step (b); and (d) causing a computational user of the application to access the container(s) or serverless execution entity (entities) on the selected routing path and executing the function(s) thereon.

The method may further include (e) determining a transfer cost for the computational user of the application to access the second container or the second serverless execution entity on the second routing path, different from the container(s) or serverless execution entity (entities) on the selected routing path, for executing the function(s) thereon; and (f) determining whether to cause the computational user of the application to access the second container or the second serverless execution entity on the second routing path and execute the function(s) thereon based at least in part on the transfer cost. In addition, the method may further include causing the computational user of the application to access the second container or the second serverless execution entity on the second routing path and execute the function(s) thereon in accordance with the determination in step (f).

In some embodiments, the method further includes updating information about the traffic information on each routing path and/or the cost, response time and/or capacity associated with the container(s) or serverless execution entity (entities) on each routing path; and determining whether to select the second routing path, different from the selected routing path, to execute the function(s) based at least in part on the updated information. In addition, the method may further include updating information about the traffic information on each routing path and/or the cost, response time and/or capacity associated with the container(s) or serverless execution entity (entities) on each routing path; and based at least in part on the updated information, determining whether to select the second routing path and cause the container(s) or serverless execution entity (entities) associated with the second routing path, different from the selected routing path, to execute the second function, different from the function(s) executed in step (d).

The function(s) may include an AWS LAMBDA function, a Google cloud function, a Microsoft Azure function, an IBM OpenWhisk function, an Oracle Cloud function, and/or a Kubernetes-based Knative function. In one embodiment, the container(s) or serverless execution entity (entities) are implemented in a cloud-based environment. In another embodiment, the container(s) or serverless execution entity (entities) are implemented in an on-premises environment. In addition, the traffic information may include a data flow rate, a bandwidth and/or a latency on each routing path. In various embodiments, the selected routing path corresponds to a higher data flow rate, a broader bandwidth, a shorter latency, and/or being associated with the container(s) or serverless execution entity (entities) having a lower data-transfer cost, a faster response time and/or a larger capacity compared to unselected routing paths.

In another aspect, the invention relates to a computer system of allocating resources to an application including multiple application components, having at least one executing one or more functions, in a serverless service architecture. In various embodiments, the computer system includes a management system configured to (a) identify multiple routing paths, each routing path being associated with the same function executed by one or more containers or serverless execution entities; (b) determine traffic information on each routing path and/or a cost, a response time and/or a capacity associated with the container(s) or the serverless execution entity (entities) on each routing path; (c) select one of the routing paths and its associated container(s) or serverless execution entity (entities) based at least in part on the determination in step (b); and (d) cause a computational user of the application to access the container(s) or serverless execution entity (entities) on the selected routing path and execute the function(s) thereon. In one implementation, the computer system further includes a processor, a storage I/O resource, a network I/O resource, and I/O pathways.

Another aspect of the invention relates to a method of allocating resources to an application including multiple application components for executing multiple functions in a serverless service architecture. In various embodiments, the method includes (a) identifying multiple routing paths, each routing path being associated with one or more containers or serverless execution entities; (b) selecting, for each of the functions, one of the routing paths and its associated container(s) or serverless execution entity (entities); and (c) causing a computational user of the application to access the container(s) or serverless execution entity (entities) corresponding to the selected routing paths for executing the corresponding functions thereon.

In various embodiments, the method further includes (d) determining traffic information on each routing path and/or a cost, a response time and/or a capacity associated with the container(s) or serverless execution entity (entities) on each routing path; the routing paths in step (b) are selected based at least in part on the determination in step (d). In addition, the method may further include (e) updating information about the traffic information on each routing path and/or the cost, response time and/or capacity associated with the container(s) or serverless execution entity (entities) on each routing path; and (0 determining, for each of the functions, whether to select the second routing path, different from the corresponding selected routing path in step (b), to execute the corresponding function based at least in part on the updated information. In one embodiment, the method further includes causing the computational user of the application to access the second container or second serverless execution entity on the second routing path and execute the corresponding function thereon in accordance with the determination in step (0.

The traffic information may include a data flow rate, a bandwidth and/or a latency on each routing path. In addition, the functions may include AWS LAMBDA functions, Google cloud functions, Microsoft Azure functions, IBM OpenWhisk functions, Oracle Cloud functions, and/or Kubernetes-based Knative functions. In one embodiment, the container(s) or serverless execution entity (entities) are implemented in a cloud-based environment. In another embodiment, the container(s) or serverless execution entity (entities) are implemented in an on-premises environment.

Still another aspect of the invention relates to a computer system of allocating resources to an application including multiple application components for executing multiple functions in a serverless service architecture. In various embodiments, the computer system includes a management system configured to (a) identify multiple routing paths, each routing path being associated with one or more containers or serverless service execution entities; (b) select, for each of the functions, one of the routing paths and its associated container(s) or serverless execution entity (entities); and (c) cause a computational user of the application to access the container(s) or serverless execution entity (entities) corresponding to the selected routing paths for executing the corresponding functions thereon. In one implementation, the computer system further includes a processor, a storage I/O resource, a network I/O resource, and I/O pathways.

In yet another aspect, a method of allocating resources to an application including multiple application components, with at least one executing one or more functions in a serverless service architecture, includes (a) identifying one or more pods having multiple containers organized as a cluster in a container system capable of executing the function(s); (b) identifying one or more routing paths in the serverless service architecture, the routing path(s) being associated with one or more serverless execution entities capable of executing the function(s) thereon; (c) determining (i) traffic information on the routing path(s), (ii) a cost or a performance characteristic associated with a computer resource bundle for the pod(s) and/or (iii) a cost or a performance characteristic associated with the serverless execution entity (entities); and (d) based at least in part on the determination in step (c), determining whether to (i) terminate execution of the function(s) on the pod(s) and (ii) cause execution of the function(s) on the serverless execution entity (entities).

The performance characteristic associated with the serverless execution entity (entities) may include a response time and/or a capacity. In addition, the computer resource bundle may include a processor, a storage I/O resource, a network I/O resource and I/O pathways connecting the plurality of containers; the performance characteristic associated therewith may include one of a clock rate of the processor, a bandwidth or a latency of the storage I/O resource, a bandwidth or a latency of the network I/O resource, and/or a bandwidth or a latency associated with the I/O pathways. In one embodiment, the traffic information includes a data flow rate, a bandwidth and/or a latency on the at least one routing path.

The container system may include a Kubernetes container system, and the function(s) may include an AWS LAMBDA function, a Google cloud function, a Microsoft Azure function, an IBM OpenWhisk function, an Oracle Cloud function, and/or a Kubernates-based Knative function. In one embodiment, the container system and the serverless execution entity (entities) are implemented in a cloud-based environment. In another embodiment, the container system is implemented in an on-premises environment and the serverless execution entity (entities) is implemented in a cloud-based environment.

In another aspect, the invention relates to a computer system of allocating resources to an application including multiple application components, with at least one executing one or more functions, in a serverless service architecture. In various embodiments, the computer system includes a management system configured to (a) identify one or more pods including multiple containers organized as a cluster in a container system capable of executing the function(s); (b) identify one or more routing paths in the serverless service architecture, the routing path(s) being associated with one or more serverless execution entities capable of executing the function(s) thereon; (c) determine (i) traffic information on the routing path(s), (ii) a cost or a performance characteristic associated with a computer resource bundle for the pod(s) and/or (iii) a cost or a performance characteristic associated with the serverless execution entity (entities); and (d) based at least in part on the determination in step (c), determine whether to (i) terminate execution of the function(s) on the pod(s) and (ii) cause execution of the function(s) on the serverless execution entity (entities). In one implementation, the computer system further includes a processor, a storage I/O resource, a network I/O resource and I/O pathways. In addition, the container system may include a Kubernetes container system, and the function(s) may include an AWS LAMBDA function, a Google cloud function, a Microsoft Azure function, an IBM OpenWhisk function, an Oracle Cloud function, and/or a Kubernates-based Knative function.

In still another aspect, a method of allocating resources to an application including multiple application components, with at least one executing one or more functions in a serverless service architecture, includes (a) identifying one or more pods having a cluster of multiple containers in a container system capable of executing the function(s); (b)

identifying one or more routing paths in a serverless service architecture, the routing path being associated with one or more serverless execution entities capable of executing the function(s) thereon; (c) determining (i) traffic information on the routing path(s), (ii) a cost or a performance characteristic associated with a computer resource bundle for the pod(s) and/or (iii) a cost or a performance characteristic associated with the serverless execution entity (entities); and (d) causing a computational user of the application to access the pod(s) or the serverless execution entity (entities) based on the determination in step (c) so as to execute the function(s) thereon.

The performance characteristic associated with the serverless execution entity (entities) may include a response time and/or a capacity. In addition, the computer resource bundle may include a processor, a storage I/O resource, a network I/O resource and I/O pathways connecting the plurality of containers; the performance characteristic associated therewith may include a clock rate of the processor, a bandwidth or a latency of the storage I/O resource, a bandwidth or a latency of the network I/O resource, and/or a bandwidth or a latency associated with the I/O pathways. In some embodiments, the traffic information includes a data flow rate, a bandwidth and/or a latency on the at least one routing path. The container system may include a Kubernetes container system, and the function(s) may include an AWS LAMBDA function, a Google cloud function, a Microsoft Azure function, an IBM OpenWhisk function, an Oracle Cloud function, and/or a Kubernates-based Knative function. In one embodiment, the container system and the serverless execution entity (entities) are implemented in a cloud-based environment. In another embodiment, the container system is implemented in an on-premises environment and the serverless execution entity (entities) is implemented in a cloud-based environment.

In another aspect, the invention pertains to a computer system of allocating resources to an application including multiple application components, with at least one executing one or more functions, in a serverless service architecture. In various embodiments, the computer system including a management system configured to (a) identify one or more pods having a cluster of multiple containers in a container system capable of executing the function(s); (b) identify one or more routing paths in a serverless service architecture, the routing path(s) being associated with one or more serverless execution entities capable of executing the function(s) thereon; (c) determine (i) traffic information on the routing path(s), (ii) a cost or a performance characteristic associated with a computer resource bundle for the pod(s), and/or (iii) a cost or a performance characteristic associated with the serverless execution entity (entities); and (d) cause a computational user of the application to access the pod(s) or the serverless execution entity (entities) based on the determination in step (c) so as to execute the function(s) thereon. In one implementation, the computer system further includes a processor, a storage I/O resource, a network I/O resource and I/O pathways. In addition, the container system may include a Kubernetes container system, and the function(s) may include an AWS LAMBDA function, a Google cloud function, a Microsoft Azure function, an IBM OpenWhisk function, an Oracle Cloud function, and/or a Kubernates-based Knative function.

Another aspect of the invention relates to a method of allocating resources to an application including multiple application components, with at least one executing one or more functions, in a serverless service architecture. In various embodiments, the method includes (a) identifying multiple computational resources associated with one or more serverless execution entities capable of executing the function(s) thereon; (b) determining a revenue and/or an expense for allocating each of the computational resources to the serverless execution entity (entities); and (c) based at least in part on the determination in step (b), determining a size associated with each of the computational resources allocated to the serverless execution entity (entities).

The method may further include causing a computational user of the application to access to the serverless execution entity (entities) and executing the function(s) thereon. In some embodiments, the revenue is generated by causing the function(s) to be executed on the serverless execution entity (entities) in response to a request, and the expense is generated by allocating the computational resources to the serverless execution entity (entities) for executing the function(s). In one embodiment, the revenue is determined based at least in part on a unit price associated with each of the computational resources and a quantity of each of the computational resources used to execute the function(s). The method may further include, upon determining that the revenue is larger than the expense, increasing the size associated with one or more of the computational resources allocated to the serverless execution entity (entities). In addition, the method may further include, upon determining that the revenue is smaller than the expense, decreasing the size associated with one or more of the computational resources allocated to the serverless execution entity (entities).

The computer resources may include a processor, a storage I/O resource, a network I/O resource and I/O pathways. In addition, the function(s) may include an AWS LAMBDA function, a Google cloud function, a Microsoft Azure function, an IBM OpenWhisk function, an Oracle Cloud function, and/or a Kubernates-based Knative function. In various embodiments, the method further includes (e) identifying at least first and second resource providers for providing the computer resources having the determined sizes, each of the resource providers offering a purchase price to the serverless execution entity (entities); and (f) automatically allocating the computer resources from the first resource provider to the serverless execution entity (entities) based at least in part on the purchase price offered thereby. In one embodiment, the purchase price offered by the second resource provider is smaller than that offered by the first resource provider.

Still another aspect of the invention relates to a computer system of allocating resources to an application having multiple application components, with at least one executing one or more function, in a serverless service architecture. In various embodiments, the computer system includes a management system configured to (a) identify multiple computational resources associated with one or more serverless execution entities capable of executing the function(s) thereon; (b) determine a revenue and/or an expense for allocating each of the computational resources to the serverless execution entity (entities); (c) based at least in part on the determination in step (b), determine a size associated with each of the computational resources allocated to the serverless execution entity (entities); and (d) cause a computational user of the application to access to the serverless execution entity (entities) and execute the function(s) thereon.

In yet another aspect, a method of allocating resources to an application having multiple application components, with at least one executing one or more functions in a serverless service architecture, includes (a) identifying multiple computational resources associated with one or more serverless execution entities capable of executing the function(s) on the computational resources; (b) determining a revenue and/or an expense for allocating each of the computational resources to the serverless execution entity (entities); and (c) based at least in part on the determined revenue and/or expense, suspending or terminating execution of the function(s) on the serverless execution entity (entities) or introducing an additional serverless execution entity in the serverless service architecture.

In one embodiment, the additional serverless execution entity is introduced upon determining that the revenue is larger than the expense (e.g., the revenue is larger than the expense for a predetermined factor). In addition, the revenue and/or the expense may be computed over a predetermined period of time. In some embodiments, execution of the function(s) on the serverless execution entity (entities) is suspended or terminated upon determining that the revenue is smaller than the expense (e.g., the revenue is smaller than the expense for a predetermined factor). In various embodiments, the revenue is generated by causing the function(s) to be executed on the serverless execution entity (entities) in response to a request, and the expense is generated by allocating the computational resources to the serverless execution entity (entities) for executing the function(s). The revenue may be determined based at least in part on a unit price associated with each of the computational resources and a quantity of each of the computational resources used to execute the function(s).

In various embodiments, the computer resources include a processor, a storage I/O resource, a network I/O resource and I/O pathways. In addition, the function(s) may include an AWS LAMBDA function, a Google cloud function, a Microsoft Azure function, an IBM OpenWhisk function, an Oracle Cloud function, and/or a Kubernates-based Knative function.

Still another aspect of the invention relates to a computer system of allocating resources to an application including multiple application components, with at least one executing one or more functions, in a serverless service architecture. In various embodiments, the computer system including a management system configured to (a) identify multiple computational resources associated with one or more serverless execution entities capable of executing the function(s) on the computational resources; (b) determine a revenue and/or an expense for allocating each of the computational resources to the serverless execution entity (entities); and (c) based at least in part on the determined revenue and/or expense, suspend or terminate execution of the function(s) on the serverless execution entity (entities) or introduce an additional serverless execution entity in the serverless service architecture. In another aspect, the invention relates to a method of allocating computer resources to a serverless execution entity capable of executing one or more functions thereon. In various embodiments, the method includes (a) determining a computer resource bundle to be purchased for the serverless execution entity to execute the function(s); (b) identifying at least first and second resource providers for providing the computer resource bundle, each of the resource providers offering a purchase price to the serverless execution entity; and (c) automatically allocating the computer resource bundle from the first resource provider to the serverless execution entity based at least in part on the purchase price offered thereby. In one implementation, the purchase price offered by the second resource provider is smaller than that offered by the first resource provider.

In one embodiment, the method further includes determining a revenue and/or an expense for allocating the computer resource bundle to the serverless execution entity and based at least in part on the determined revenue and/or expense, determining a size associated with the computer resource bundle; the computer resource bundle to be purchased has the determined size. The revenue may be generated by causing the function(s) to be executed on the serverless execution entity in response to a request, and the expense may be generated by allocating the computer resource bundle to the serverless execution entity for executing the function(s). In addition, the revenue may be determined based at least in part on a unit price associated with each resource in the computer resource bundle and a quantity of each resource in the computer resource bundle used to execute the function(s). In one embodiment, the revenue and/or the expense is computed over a predetermined period of time. The computer resource bundle may include a processor, a storage I/O resource, a network I/O resource and I/O pathways. In addition, the function(s) may include an AWS LAMBDA function, a Google cloud function, a Microsoft Azure function, an IBM OpenWhisk function, an Oracle Cloud function, and/or a Kubernates-based Knative function.

In still another aspect, the invention pertains to a computer system of allocating computer resources to a serverless execution entity capable of executing one or more functions thereon. In various embodiments, the computer system including a management system configured to (a) determine a computer resource bundle to be purchased for the serverless execution entity to execute the function(s); (b) identify at least first and second resource providers for providing the computer resource bundle, each of the resource providers offering a purchase price to the serverless execution entity; and (c) automatically allocate the computer resource bundle from the first resource provider to the serverless execution entity based at least in part on the purchase price offered thereby. In one implementation, the purchase price offered by the first resource provider is smaller than that offered by the second resource provider.

The management system may be further configured to determine a revenue and/or an expense for allocating the computer resource bundle to the serverless execution entity and based at least in part on the determined revenue and/or expense, determine a size associated with the computer resource bundle; the computer resource bundle to be purchased has the determined size. In various embodiments, the revenue is generated by causing the function(s) to be executed on the serverless execution entity in response to a request, and the expense is generated by allocating the computer resource bundle to the serverless execution entity for executing the function(s). In addition, the management system may be further configured to determine the revenue based at least in part on a unit price associated with each resource in the computer resource bundle and a quantity of each resource in the computer resource bundle used to execute the function(s). In one embodiment, the revenue and/or the expense is computed over a predetermined period of time. The computer resource bundle may include a processor, a storage I/O resource, a network I/O resource and I/O pathways. In addition, the function(s) may include an AWS LAMBDA function, a Google cloud function, a Microsoft Azure function, an IBM OpenWhisk function, an Oracle Cloud function, and/or a Kubernates-based Knative function.

Reference throughout this specification to "one example," "an example," "one embodiment," or "an embodiment" means that a particular feature, structure, or characteristic described in connection with the example is included in at least one example of the present technology. Thus, the occurrences of the phrases "in one example," "in an example," "one embodiment," or "an embodiment" in various places throughout this specification are not necessarily all referring to the same example. Furthermore, the particular features, structures, routines, steps, or characteristics may be combined in any suitable manner in one or more examples of the technology. The headings provided herein are for convenience only and are not intended to limit or interpret the scope or meaning of the claimed technology.

BRIEF DESCRIPTION OF THE DRAWINGS

In the drawings, like reference characters generally refer to the same parts throughout the different views. Also, the drawings are not necessarily to scale, with an emphasis instead generally being placed upon illustrating the principles of the invention. In the following description, various embodiments of the present invention are described with reference to the following drawings, in which.

DETAILED DESCRIPTION

Figure 1:
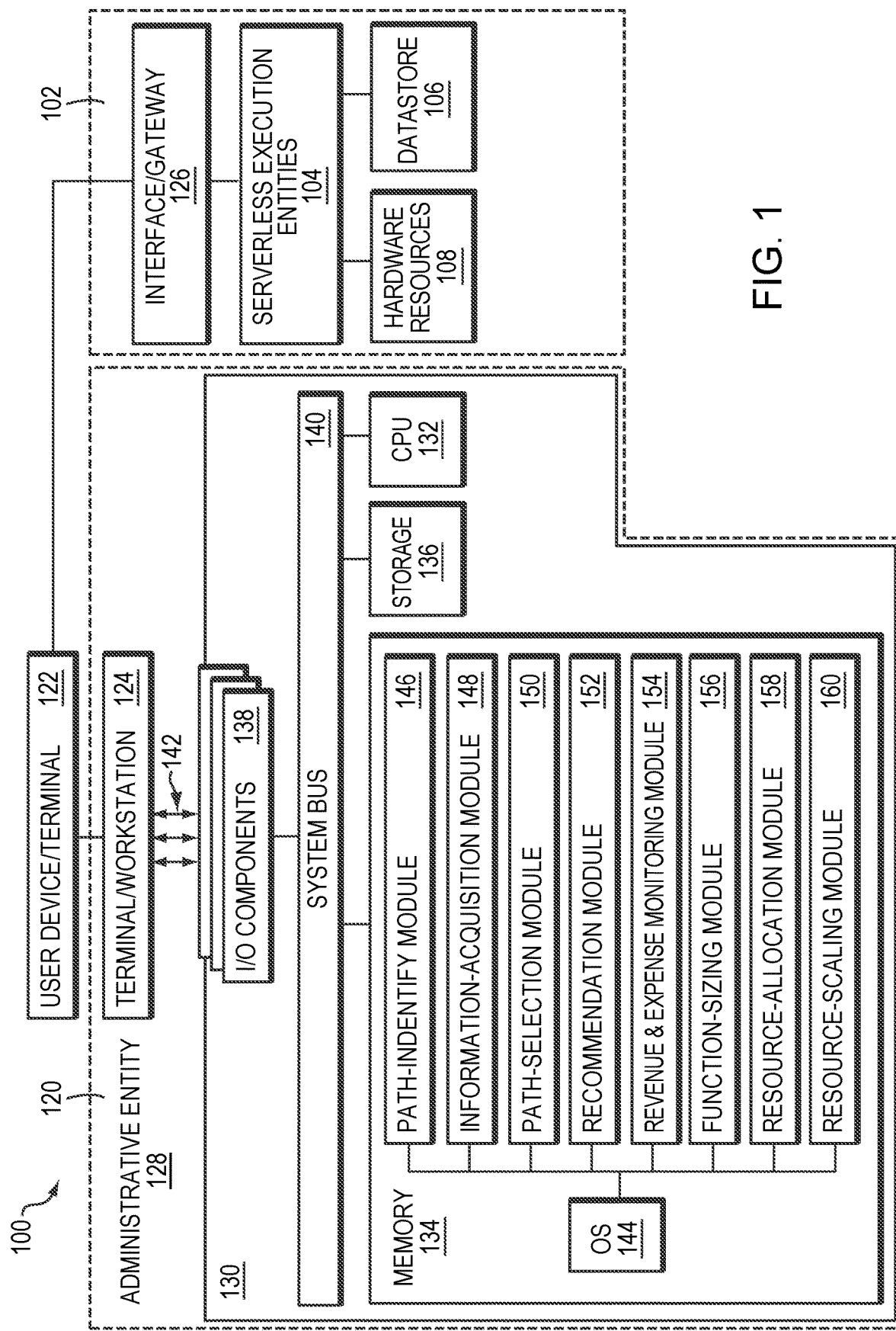
FIG. 1 schematically depicts an exemplary serverless service architecture in accordance with various embodiments of the current invention.

FIG. 1 schematically shows an exemplary service system 100 including a service provider (e.g., a cloud-computing service provider) 102 for providing an infrastructure platform upon which a cloud environment can be supported. In one embodiment, the system 100 is designed and configured for serverless computing and employs a corresponding serverless platform, serverless cloud infrastructure, etc. The serverless platform may include one or more serverless execution entities 104 (e.g., instances, virtual machines, containers and/or physical computers), a datastore 106, and hardware resources 108 configured to control and support operations of the serverless execution entities 104 in the cloud environment. In one embodiment, the serverless execution entities 104 provide stateless function-execution services; thus, no charge is required if the serverless execution entities 104 are not used. The serverless platform may include AWS LAMBDA, GOOGLE CLOUD Function, MICROSOFT AZURE Function, IBM OPENWHISK, ORACLE CLOUD and/or Kubernetes-based KNATIVE platform. As used herein, the term "serverless" refers to a relatively high level of abstraction in cloud computing. The use of this term should not be construed to mean that there are no servers in the corresponding system, but rather that the underlying infrastructure platform (including physical and virtual hosts, virtual machines, instances, containers, etc.) as well as the operating system, is abstracted away from (i.e., not visible to) the user/developer. For example, in serverless computing, applications can be run in stateless computing containers that may be event-triggered. Users/developers can create functions and then rely on the serverless cloud infrastructure and/or a management system 120 to allocate proper resources to execute the function as further described below.

In various embodiments, the management system 120 is configured to enable users to use one or more service providers 102 to develop and deploy a computing application via user devices and/or terminals 122. The management system 120 may create, develop, troubleshoot, and/or upload the computing application to the infrastructure platform provided by the serverless service provider 102 using, for example, a terminal and/or workstation 124 at the system side and an interface or gateway 126 designated as the frontend at the service-provider side. In a typical service management, the management system 120 is a customer of the service provider 102, whereas the users represented by terminals 122 are customers of the management system 120. At the same time, terminals 122 are clients of the cloud environment.

The management system 120 may also include an automated administrative entity 128 for managing and supporting execution of the computing application. In one embodiment, the administrative entity 128 includes a networked computer 130 having a central processing unit (CPU) 132, a memory 134 (which can be implemented as any type of volatile memory, such as SDRAM, or non-volatile, such as Flash memory), a storage device 136 (such as a magnetic, solid-state, or flash disk), and one or more input/output (I/O) components (e.g., a network I/O resource, I/O pathways, etc.) 138. The CPU 132 may be configurable to host one or more virtual machines and/or run various processes corresponding to manage and support execution of the computing application as further described below. In addition, the CPU 132 may provide various computational functions described below through software, hardware, firmware, hardwiring, or any combination thereof. For example, the CPU 132 may include a general-purpose or special-purpose digital data processor programmed with software in a conventional manner. Memory 134 may temporarily store transitory information and allow the CPU 132 to quickly access the stored information. The storage device 136 may store more-permanent information in a non-volatile manner. For example, one or more storage devices 136 may be used to implement a datastore 116 storing, for example, a database of service-level agreements (SLAs) between the proprietor of the management system 120 and the users. The I/O components 138 may be connected to system interfaces. All of these elements in the computer 130 are interconnected using an internal bus 140. In addition, the computer 130 may include one or more external links 142 for connecting the computer 130 to elements in the infrastructure platform of the service provider 102 and/or the user devices/terminals 122.

The memory 134 may include instructions for low-level operation of the computer 130, such as operating-system instructions, device-driver-interface instructions, or any other type of such instructions. The operating system is not limited to any particular type; rather, any operating system (such as WINDOWS, LINUX, or OSX) and/or other instructions are within the scope of the present invention. As further described below, the memory 134 may include an operating system 144 for directing the execution of low-level, basic system functions such as memory allocation, file management and operation of the main memory 134 and/or storage device 136. In addition, the memory 134 may include instructions, such as a path-identifying module 146 for identifying multiple routing paths, each associated with a serverless execution entity and/or a container (or a cluster of containers) for executing a function in a computing application, and deploying equivalent functions onto the serverless execution entities located on the routing paths, an information-acquisition module 148 for acquiring and/or determining traffic information on each of the routing paths and/or a characteristic (e.g., a cost, a response time and/or a capacity) associated with the serverless execution entity/container on each of the routing paths, a path-selection module 150 for selecting the optimal routing path and its associated serverless execution entity/container to execute the computing function based on the determined traffic information and/or the characteristic of the serverless execution entity/container, a recommendation module 152 for recommending the selected routing path to the computing function and/or causing the computing function to be executed on the corresponding serverless execution entity/container on the selected routing path, a revenue and expense monitoring module 154 for determining the revenue and/or expense for allocating one or more computational resources to the serverless execution entity/container, a function-sizing module 156 for determining a size associated with one of the computational resources allocated to the serverless execution entity/container for executing the computing function, a resource-allocation module 158 for allocating the optimal resources having the determined sizes to the serverless execution entity/container, and a resource-scaling module 160 for scaling up, down or out and/or terminate the serverless execution entity/container.

In operation, a computing application may be first deployed in a cloud-based environment by the user and/or the management system 120 via the terminal 124 and/or interface 126; optionally, the application may be stored in the memory 134, storage device 136 and/or any memory/storage device associated with the service provider 102. In one embodiment, the application includes multiple application components for executing one or more computing functions. An example of the application may be a NETFLIX transaction-processing application; one function of the transaction application may be a recommendation generator that gives the customer recommendations for additional movies. The management system 120 may delegate execution of the function(s) to one or more serverless execution entities 104 and/or containers and/or manage the function execution in the cloud-based or on-premises environment as further described below. Function execution may be triggered by, for example, a user request and/or other relevant events, such as changes to the pertinent data saved in memory 134.

Figure 2A:
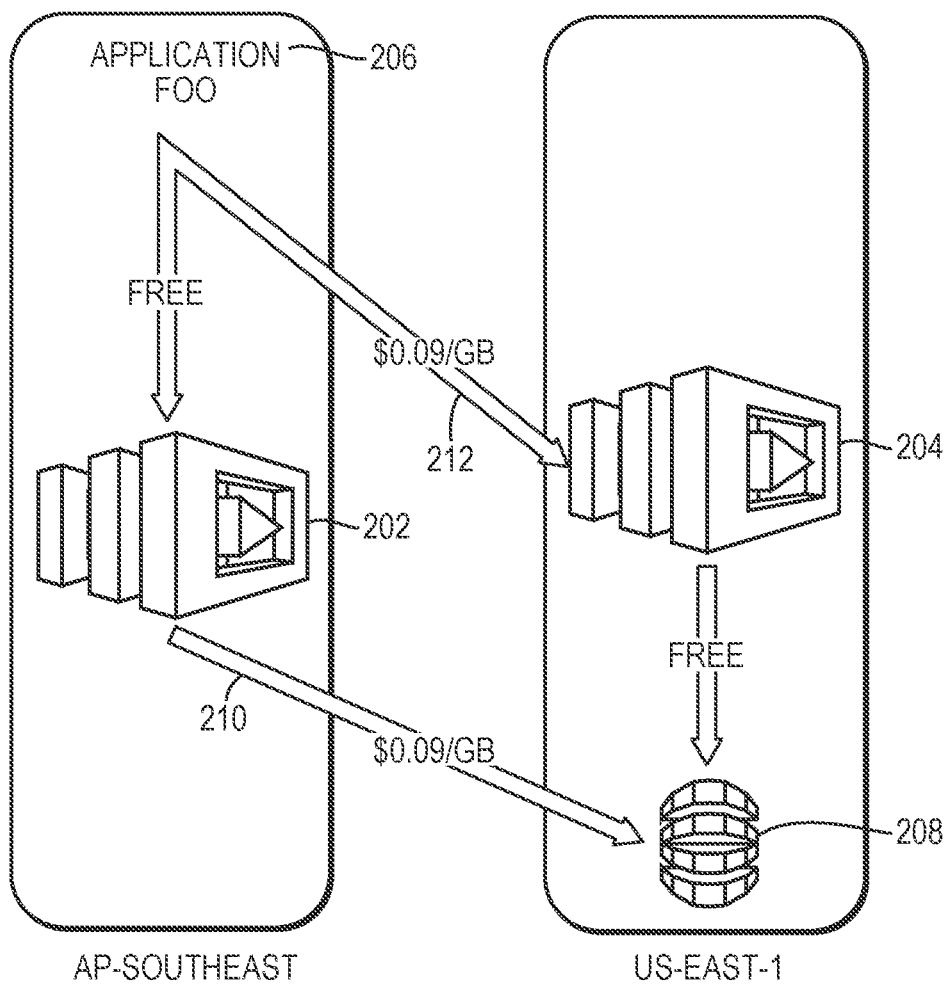
FIG. 2A depicts multiple serverless execution entities employed in multiple regions/clusters for executing a function in a computing application in accordance with various embodiments of the current invention.
Figure 2B:
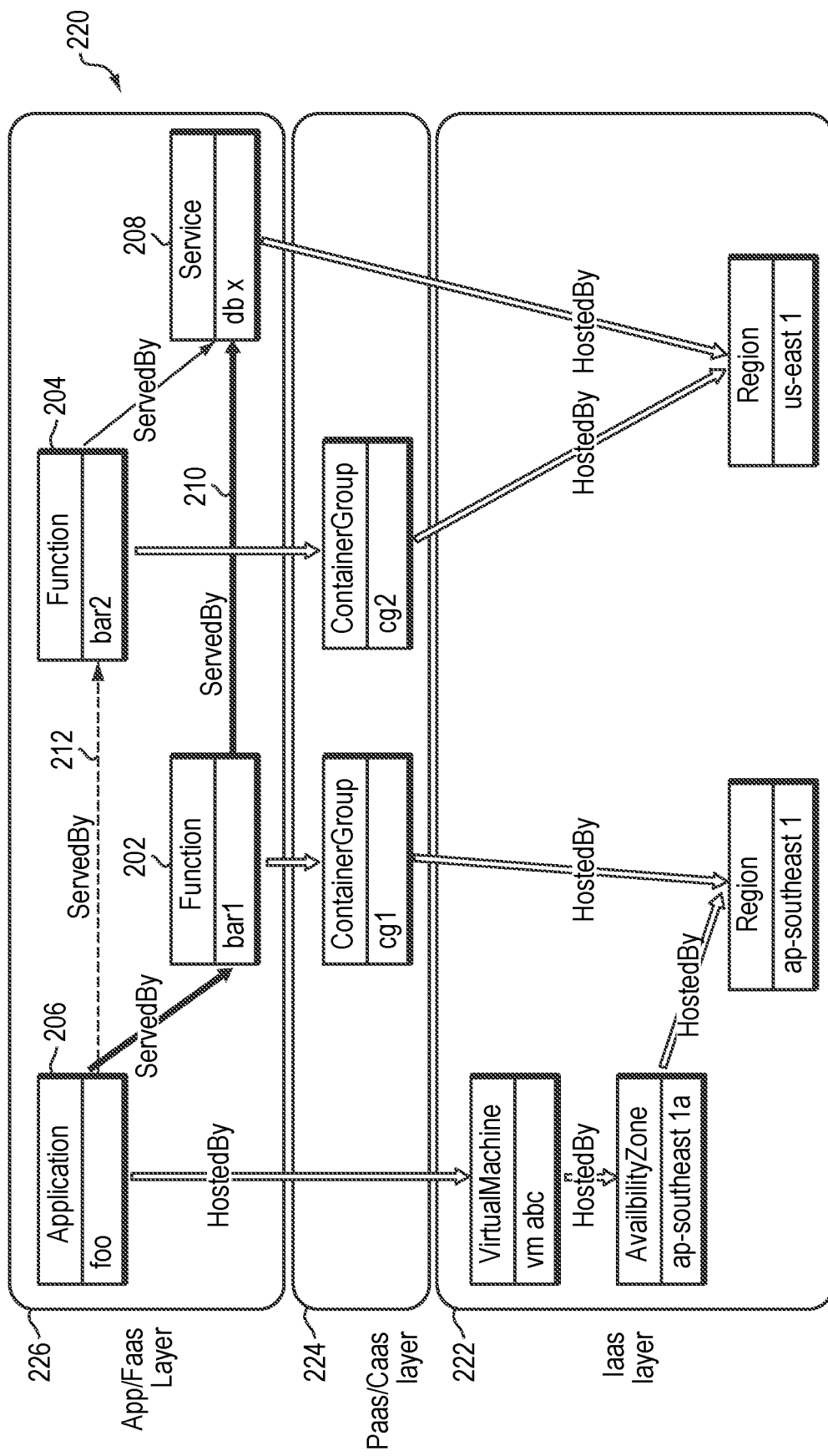
FIG. 2B schematically depicts a multilayered hierarchical software framework for executing a function in a computing application in accordance with various embodiments of the current invention.

The serverless execution entities 104 may be employed at multiple regions/clusters in the cloud-based environment. For example, referring to FIG. 2A, a serverless execution entity 202 and a serverless execution entity 204 may be employed in the Asia-Pacific (AP) southeast region and the U.S. east region, respectively. Because the source region (i.e., the requesting computing application 206) is located in the AP southeast region and the datastore and/or service 208 required for executing the requested function is located in the U.S. east region, two routing paths 210, 212 may exist for obtaining function execution. For the routing path 210, no data-transfer cost is required for the entity requesting the computing function to access the serverless execution entity 202 (because they are located in the same region), but there is a data-transfer cost for the serverless execution entity 202 to access the datastore 208 (because they are located in different regions). In contrast, for the routing path 212, there is a data-transfer cost for the computing function to access the serverless execution entity 204, but it is free for the serverless execution entity 204 to access the datastore 208. FIG. 2B schematically depicts a multilayered hierarchical software framework 220 for executing one or more functions in the computing application. The framework 220 may include a first layer 222 that implements infrastructure as a service (IaaS), a second layer 224 that implements a platform as a service (Paas) and/or containers as a service (CaaS), and a third layer 226 that implements a function as a service (FaaS). Again, the same function service provided by two serverless execution entities 202, 204 on the FaaS layer may be used to execute a function in the computing application 206.

To determine which routing path and its associated serverless execution entity for executing the computing function, it may be necessary to acquire information about traffic that represents the volumes and types of network traffic on each routing path. The traffic information may be measured using any suitable hardware and/or software tools. For example, the traffic may be computed using a network protocol, such as NetFlow or ISTIO. In addition, the management system 120 (e.g., the information-acquisition module 148) may acquire information about a characteristic (e.g., a cost, a response time and/or a capacity) associated with the serverless execution entity on each routing path. For example, the management system may receive the cost information and response time from the cloud provider and ISTIO, respectively. Additionally or alternatively, the management system 120 may analyze a historical trend of the value associated with the characteristic and, based thereon, determine or predict the current value associated with the characteristic. In one embodiment, the current characteristic value is determined based on the last sampled value in the historical trend.

Based on the acquired traffic information on each routing path and/or the characteristic associated with the serverless execution entity on each routing path, the management system 120 (e.g., the path-selection module 150) may then select the optimal routing path to execute the function. For example, the selected routing path may have a higher data flow rate, a broader bandwidth, a shorter latency, and/or include a serverless execution entity 104 that has a lower data-transfer cost for accessing the datastore 208 and/or allowing the computing function to access thereto, a faster response time and/or a larger capacity. Upon selection of the routing path, the management system 120 (e.g., the recommendation module 152) may then cause the computing function requester to access the serverless execution entity on the selected routing path so as to execute the function uploaded and stored in the memory 134 and/or storage device 136. Alternatively, the management system 120 (e.g., the recommendation module 152) may transmit the computing function stored in the memory 134 and/or storage device 136 to the serverless execution entity on the selected routing path so as to obtain execution thereof.

Figure 2C:
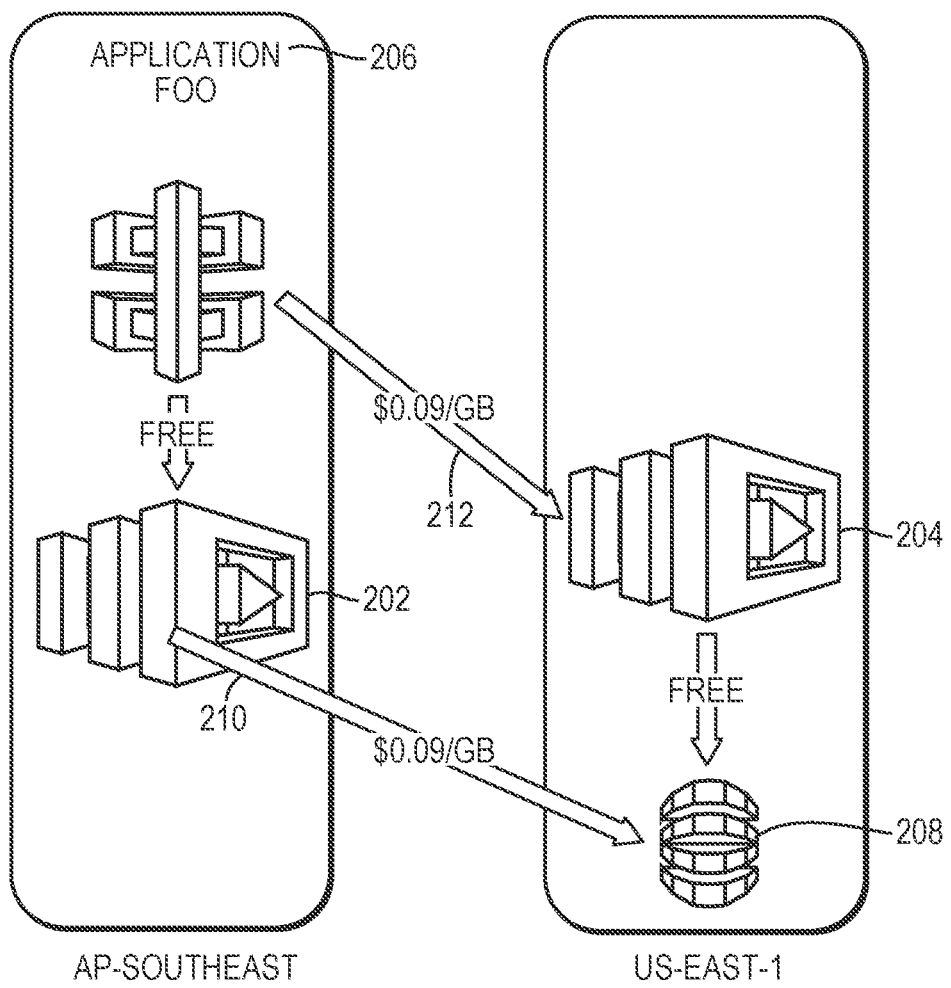
FIG. 2C schematically depicts deployment of equivalent functions, via a gateway, in multiple serverless execution entities that are located in different clusters/regions in accordance with various embodiments of the current invention.

In various embodiments, the user and/or the management system 120 (e.g., the path-identifying module 146), upon identifying different routing paths, deploys equivalent functions onto the serverless execution entities located on the routing paths in order to facilitate traffic engineering. This does not result in a financial burden on the user because, again, the serverless execution entities may provide stateless function-execution services, and no resources are expended if the serverless execution entities 104 are not used. Referring to FIG. 2C, assuming the serverless execution entity 202 is located in the source region (i.e., the location of the computing function 206) as depicted, the management system 120 (e.g., the path-identifying module 146) may copy and deploy the function to be executed on the serverless execution entity 204 located in the destination region (e.g., the location of the datastore 208). The user and/or the management system 120 may then access the serverless execution entities 202, 204 via a gateway for reconfiguring the routing path for executing the function as further described below. For example, a function service provided by the AWS LAMBDA platform can be accessed via an API Gateway in the source region to execute "per-function" traffic rerouting.

To facilitate traffic engineering, the management system 120 (e.g., the information-acquisition module 148) may acquire real-time updated information about the traffic information on each of the routing paths 210, 212 and/or the characteristic (e.g., the cost, response time and/or capacity) associated with the serverless execution entities 202, 204 on the routing paths 210, 212. For example, assuming that the computing function in the application 206 is executed using the serverless execution entity 202 on the routing path 210, if the updated information indicates that the traffic information on the routing path 212 is better (e.g., having a higher data flow rate, a broader bandwidth and/or a shorter latency), the data-transfer cost for the computing function to access the serverless execution entity 204 on the routing path 212 is lower than the data-transfer cost for the serverless execution entity 202 on the routing path 210 to access the datastore 208, and/or the serverless execution entity 204 has a faster response time and/or a larger capacity, the management system 120 (e.g., the recommendation module 152) may recommend/cause the function in the application 206 to be transferred to and executed by the serverless execution entity 204 on the routing path 212, instead. In some embodiments, upon determining that the routing path 212 is a better choice, the management system 120 may wait until the computing function is fully executed before recommending/causing a second function in the application to be executed by the serverless execution entity 204 on the rerouting path 212.

Typically, the serverless execution entities 202, 204 include multiple common computational resources or commodities for executing the computing function. In one embodiment, one of the common commodities is a commodity-accessing key; this ensures that the computing function can be placed and executed by the correct function service having the same access key on the serverless execution entities 202, 204. In addition, if the serverless execution entity on the rerouting path does not include the required serverless service function (e.g., AWS LAMBDA) for executing the computing function, the management system 120 may copy and deploy the necessary serverless service function in the serverless execution entity 204 on the rerouting path for ensuring facilitation of traffic engineering. It should be noted that the serverless platform providing the serverless execution entity on each routing path may be the same or different. For example, the serverless execution entities 202, 204 may be both provided by AWS LAMBDA; alternatively, the serverless execution entity 202 may be provided by AWS LAMBDA, where the serverless execution entity 204 may be provided by MICROSOFT AZURE Function. Further, although the above descriptions consider a cloud-based environment, it will be understood that the principles described herein may also be applied to an on-premises environment. For example, the serverless service provider 102 depicted in FIG. 1 may include on-premises resources (e.g., VMs) for executing the function(s) in a computing application.

In various embodiments, each routing path is associated with one or more containers in a container system for executing the function in the computing application; the containers may be in the cloud-based environment or in the on-premises environment. Container systems provide an operating-system level virtualization in which the kernel of an operating system can support multiple isolated user-space instances. Stated another way, a container is based on server virtualization that uses a shared operating system. Rather than virtualizing hardware and creating entire virtual machines, each with its own operating system, containers run atop the shared operating system kernel and file system. Like shipping containers for cargo, these software containers can ship applications (and their associated functions) across different network-based systems (e.g., cloud computing based systems) and limit the impact of one container's activities on another container.

A container system may include software abstractions to virtualize computer resources (or compute resources) which are used by applications running in the container ("containerized" applications). The container system provides means to provision containers, allocate and control the resources available to a container, deploy and execute applications in the container, and facilitate full use of the container resources by such containerized applications, while isolating them from other applications, sharing the underlying resources. When a containerized application accesses a virtualized container resource (e.g., CPU, memory, storage I/O, Network I/O), the container system maps this access to a direct access of the underlying real resource.

Figure 3:
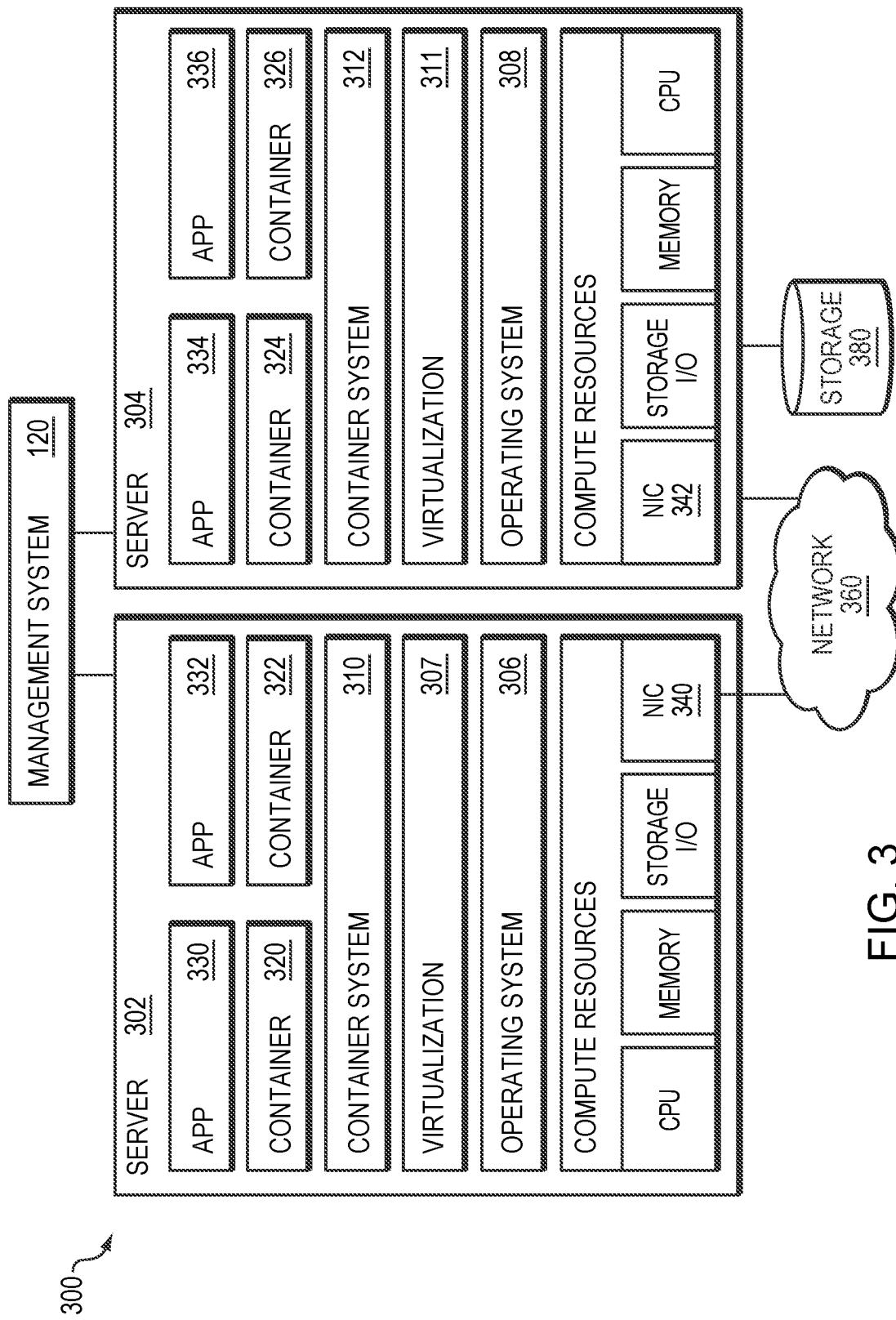
FIG. 3 is a block diagram of an example container environment in accordance with various embodiments of the current invention.

FIG. 3 illustrates a representative container system 300 in accordance with various embodiments. The system 300 includes two servers 302, 304 that run respective container systems 310, 312. The container system 310, at the server 302, allocates computer resources (or compute resources) of the server 302—e.g., CPUs, memories, storage volume, storage, and/or network I/O pathways and bandwidth—to two containers 320, 322. Similarly, the container system 312 at the server 304 allocates resources of the server 304 to containers 324, 326. The containers 320, 322, 324, 326 execute respective containerized applications 330, 332, 334, 336.

As previously discussed, container systems permit flexible organization. In the example system 300, the servers 302, 304 may be physical machines with physical computer (or computational) resources. Alternatively, the server 302 may be a virtual machine with virtualized resources while the server 304 is a physical server. The containers 320, 322, 324, 326 may be distinct containers, or replicated copies of a single container. In some embodiments, a group of containers may be clustered into a container-Point-of-Delivery (cPOD) system, to run related applications. The I/O pathway between the applications 330, 334 traverses the application 330, the container 320, the container system 310, an operating system 306, a network interface card (NIC) 340, a data network 360, a NIC 342, an operating system 308, the container system 312, the container 324, and the application 334. Further details of the container system and approaches for managing resources therein are provided, for example, in U.S. Pat. No. 10,346,775, the entire disclosure of which is hereby incorporated herein by reference.

In various embodiments, the containers 330-336 are located in different clusters/regions, and the computing function in the application 206 can be executed by any one of the containers 330-336. The management system 120 described above may then be implemented to select the optimal routing path and cause the computing function to be executed by the container on the selected routing path using the approaches described above.

Figure 4:
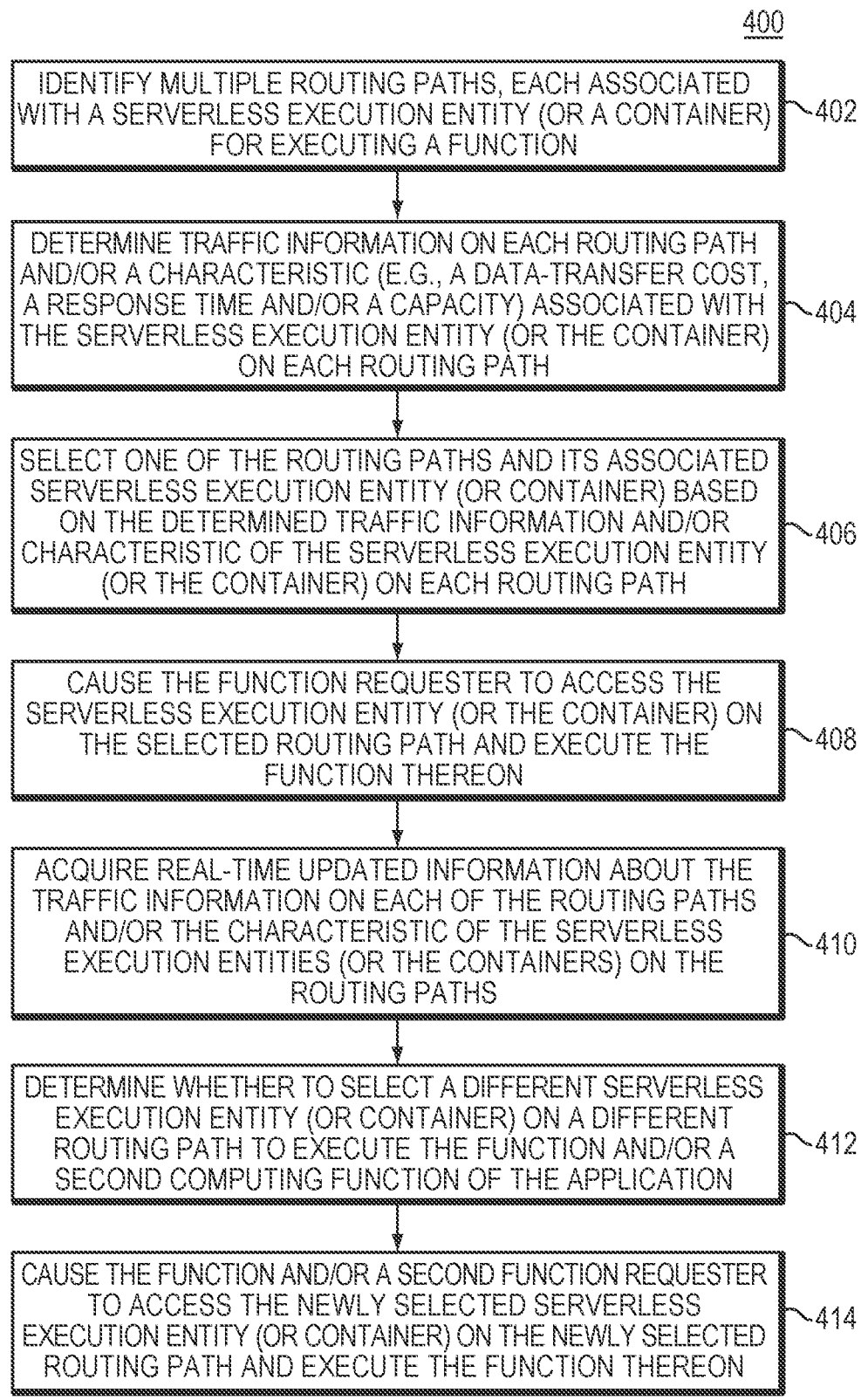
FIG. 4 is a flow chart illustrating an approach for allocating resources to an application having multiple application components for executing one or more computing functions in accordance with various embodiments of the present invention.

FIG. 4 is a flow chart illustrating an exemplary procedure 400 for allocating resources to an application having multiple application components for executing one or more functions that have been uploaded to a serverless service provider 102 or a container provider via, for example, the terminal 124 and/or interface 126. Optionally, the uploaded function may be stored in memory associated with the management system 120 and/or serverless service provider 102 (or a storage I/O resource associated with the container provider). In a first step 402, the management system 120 (e.g., the path-identifying module 146) may identify multiple routing paths, each associated with a serverless execution entity (or a container) for executing a function in the application. In a second step 404, the management system 120 (e.g., the information-acquisition module 148) may determine traffic information on each routing path and/or a characteristic (e.g., a data-transfer cost, a response time and/or a capacity) associated with the serverless execution entity (or container) on each routing path. In a third step 406, the management system 120 (e.g., the path-selection module 150) may select one of the routing paths and its associated serverless execution entity or container based at least in part on the determined traffic information and/or characteristic of the serverless execution entity (or container) on each routing path. In a fourth step 408, the management system 120 (e.g., the recommendation module 152) may cause the computing function requester to access the serverless execution entity (or container) on the selected routing path and execute the function thereon. In various embodiments, while the function is executed by the serverless execution entity (or container) on the selected routing path, the management system 120 (e.g., the information-acquisition module 148) may acquire real-time updated information about the traffic information on each of the routing paths and/or the characteristic of the serverless execution entities (or containers) on the routing paths (step 410). Based at least in part on the updated information, the management system 120 (e.g., the path-selection module 150) may determine whether to select a different serverless execution entity (or container) on a different routing path to execute the computing function and/or a second computing function of the application (step 412). When a different serverless execution entity (or container) is selected, the management system 120 (e.g., the recommendation module 152) may cause the computing function requester and/or a second function, different from the computing function in the application, to access the newly selected serverless execution entity (or container) on the newly selected routing path and execute the function thereon (step 414).

In some embodiments, the application includes multiple functions. Steps 402-414 may be implemented to simultaneously or subsequently select the best routing paths for the functions and/or cause the functions to be simultaneously or subsequently executed on the serverless execution entities (or containers) corresponding to the selected routing paths.

Figure 5A:
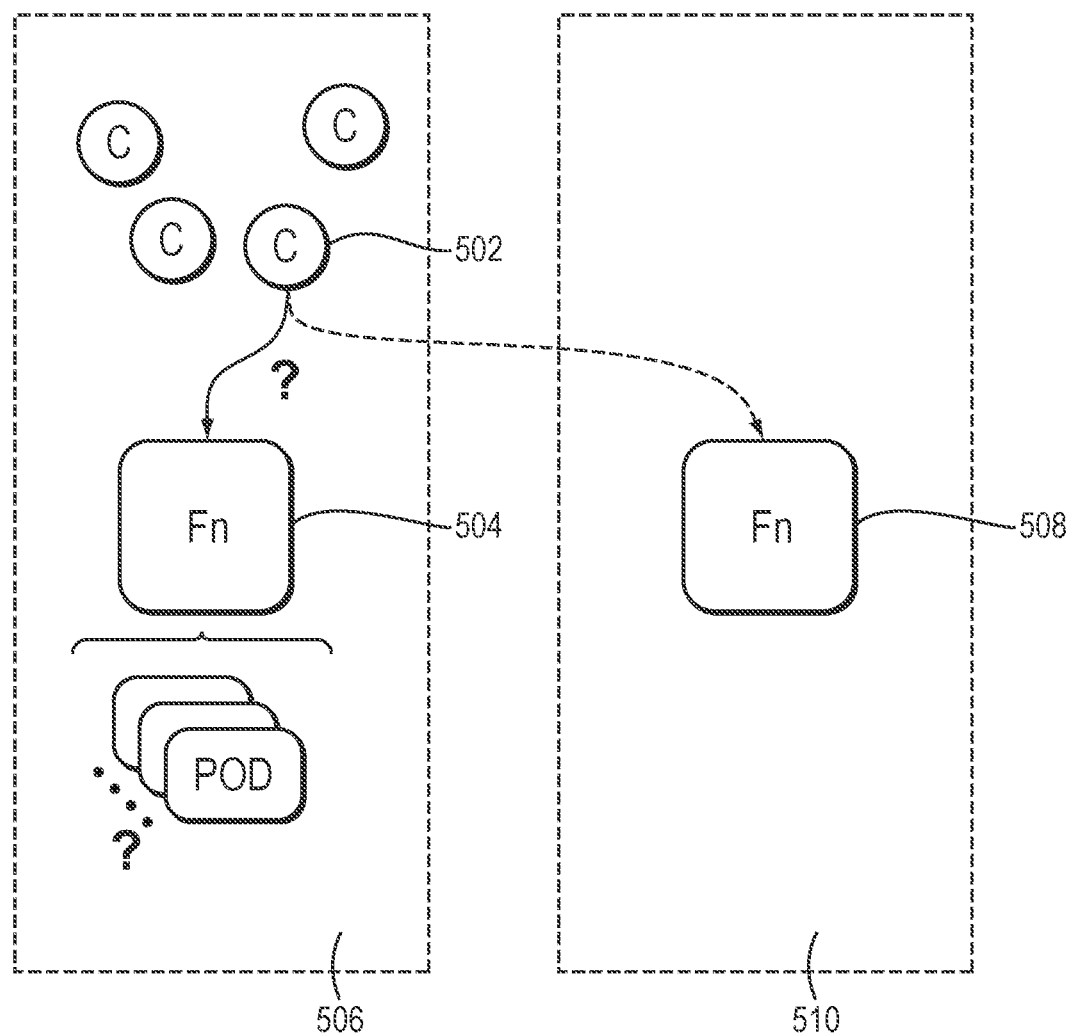
FIGS. 5A and 5B depict an on-premises environment and a cloud-based environment for executing a function in a computing application in accordance with various embodiments of the current invention.
Figure 5B:
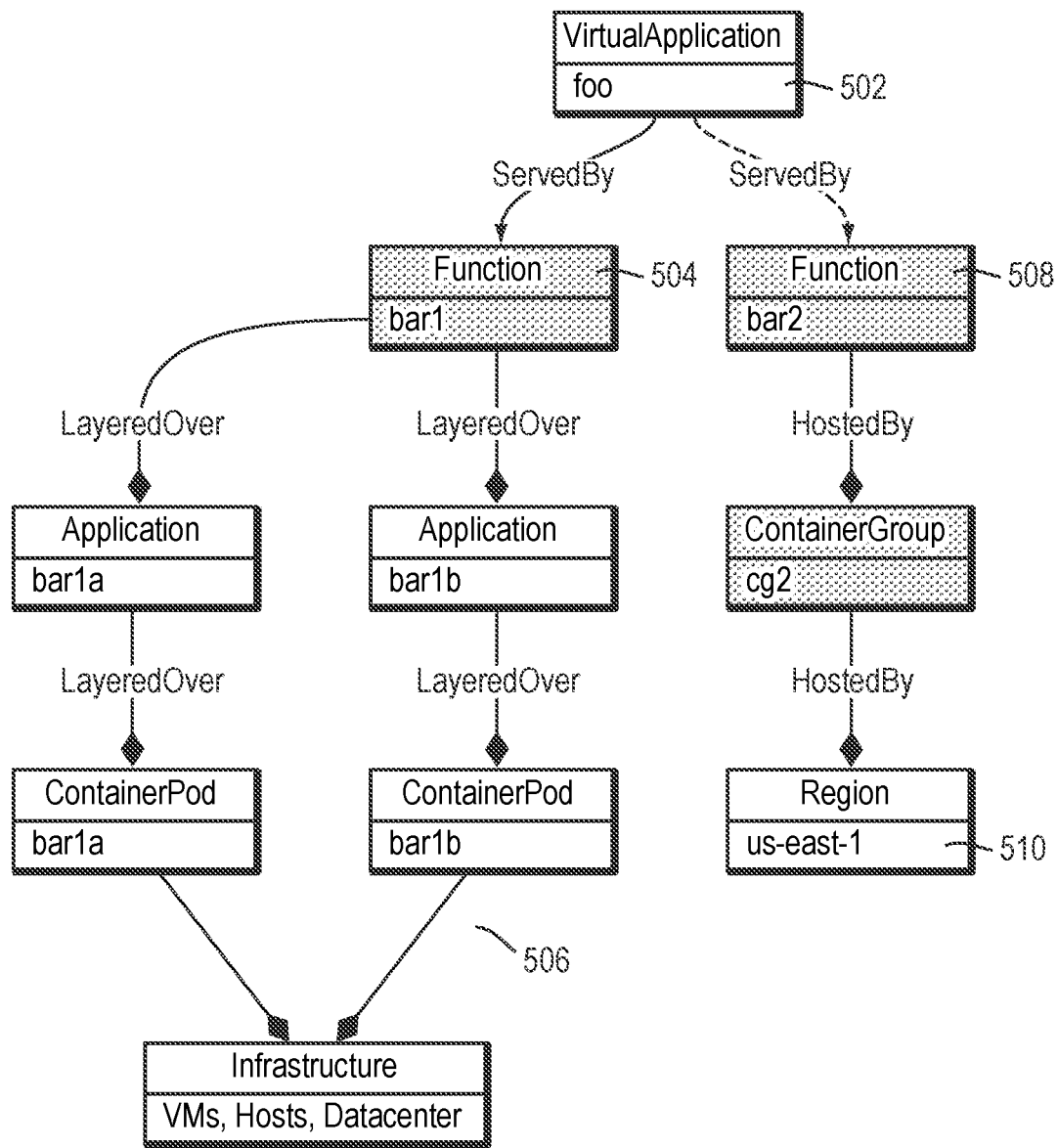

In various embodiments, the management system 120 may facilitate traffic engineering for execution of a computing function between an on-premises environment and a cloud-based environment. For example, referring to FIGS. 5A and 5B, a computing function 502 in an application may be executed by a function service 504 provided by a container or a cluster of containers (e.g., a pod) in the on-premises environment 506 or a function service 508 (which may be the same as service 504) provided by a serverless execution entity (or a cloud-based container or pod) in the cloud-based environment 510. For ease of reference, the following description refers to using the function service provided by a pod to execute the computing function 502 in the on-premises environment; it should be understood, however, that a single container may suffice to provide the function service for executing the computing function 502 as well. The pod may include a computer resource bundle having, for example, a processor, a storage I/O resource, a network I/O resource and I/O pathways connecting the containers as further described below. In addition, the following description refers to using the function service provided by a serverless execution entity (e.g., AWS LAMBDA) to execute the computing function in the cloud-based environment; it should be understood, however, that a cloud-based container or pod may also provide the functionality for executing the computing function in the cloud-based environment as well.

To determine which environment is used for executing the computing function 502, in various embodiments, the management system 120 (e.g., the information-acquisition module 148) may acquire a cost and/or a performance characteristic (e.g., a clock rate of the processor, a bandwidth or a latency of the storage I/O resource, a bandwidth or a latency of the network I/O resource, or a bandwidth or a latency associated with the I/O pathways) associated with the computer resource bundle for the pod in the on-premises environment 508 and a cost (e.g., the data-transfer cost for the computing function 502 to access the serverless execution entity located in a different region/cluster) and/or a performance characteristic (e.g., a response time and/or a capacity) associated with the serverless execution entity in the cloud-based environment 510. Optionally, the management system 120 (e.g., the information-acquisition module 148) may also acquire traffic information on the routing path from the source region (i.e., where the computing function 502 is located) to the serverless execution entity offering the function service 508 in the cloud-based environment 510. Based on the acquired costs and/or performance characteristics associated with the pod and the serverless execution entity as well as the traffic information, the management system 120 (e.g., the path-selection module 150) may then select the pod in the on-premises environment 506 or the serverless execution entity in the cloud-based environment 510 to execute the function. For example, when the cost associated with the computer resource bundle for the pod is lower than the data-transfer cost associated with the serverless execution entity and/or the performance characteristic associated with the pod is satisfactory (e.g., a high processor clock rate, broad bandwidth or short latency of the storage I/O resource, broad bandwidth or short latency of the network I/O resource, or broad bandwidth or short latency associated with the I/O pathways), the management system 120 (e.g., the recommendation module 152) may recommend that the function 502 requester use the function service 504 provided by the pod in the on-premises environment 506 to execute the function 502. Conversely, when the data-transfer cost associated with the serverless execution entity in the cloud-based environment 510 is lower than the cost associated with the computer resource bundle for the pod in the on-premises environment 506 and/or the performance characteristic associated with the serverless execution entity is satisfactory (e.g., a short response time and/or a large capacity), the management system 120 (e.g., the recommendation module 152) may recommend and cause the computing function 502 to be executed by the function service 508 provided by the serverless execution entity in the cloud-based environment 510.

The management system 120 may be further configured to facilitate traffic engineering for execution of the computing function 502 (and/or a different computing function in the application) between the on-premises environment 508 and the cloud-based environment 510. In one embodiment, the management system 120 (e.g., the information-acquisition module 148) acquires real-time information about the cost and/or performance characteristic associated with the pod and the serverless execution entity in the on-premises environment 506 and cloud-based environment 510, respectively, and/or the traffic information on the routing path from the computing function 502 to the serverless execution entity in the cloud-based environment 510. Assuming that the computing function 502 is executed using the serverless execution entity in the cloud-based environment 510, the management system 120 may recommend/cause the function to be transferred to the pod in the on-premises environment 506 and execute the function therein if the acquired real-time information indicates that the traffic information on the routing path from the source region to the serverless execution entity in the cloud-based environment 510 is unsatisfactory (e.g., having a low data flow rate, a narrow bandwidth and/or a long latency), the data-transfer cost associated with the serverless execution entity in the cloud-based environment 510 is higher than the cost associated with the pod in the on-premises environment 508 and/or the performance associated with the pod is improved (e.g., a processor with a higher clock rate, broader bandwidth or shorter latency of the storage I/O resource, broader bandwidth or shorter latency of the network I/O resource, or broader bandwidth or shorter latency associated with the I/O pathways). Similarly, the management system 120 may cause the function that is currently executed on the pod in the on-premises environment 506 to be transferred to the serverless execution entity in the cloud-based environment 510 and executed thereon if the acquired real-time information indicates that a lower cost and/or better performance can be achieved in the cloud-based environment 510. In some embodiments, upon determining that another environment, different from the current environment in which the function is executed, has a lower cost and/or better performance for executing the computing function 502, the management system 120 (e.g., the recommendation module 152) may wait until the current computing function 502 is fully executed before recommending or causing a second function, different from the current computing function 502, in the application to be executed in the newly determined environment.

In some embodiments, the containers and pods in the container system are employed in a cloud-based environment. For example, the container system may include a Kubernetes (k8s) cluster maintained by the Cloud Native Computing Foundation. The approaches described above for facilitating traffic engineering between the on-premises environment 506 and the cloud-based environment 510 may be implemented to facilitate traffic engineering between the Kubernetes cluster in the cloud-based environment and the serverless execution entity (e.g., AWS LAMBDA) in the cloud-based environment.

Figure 5C:
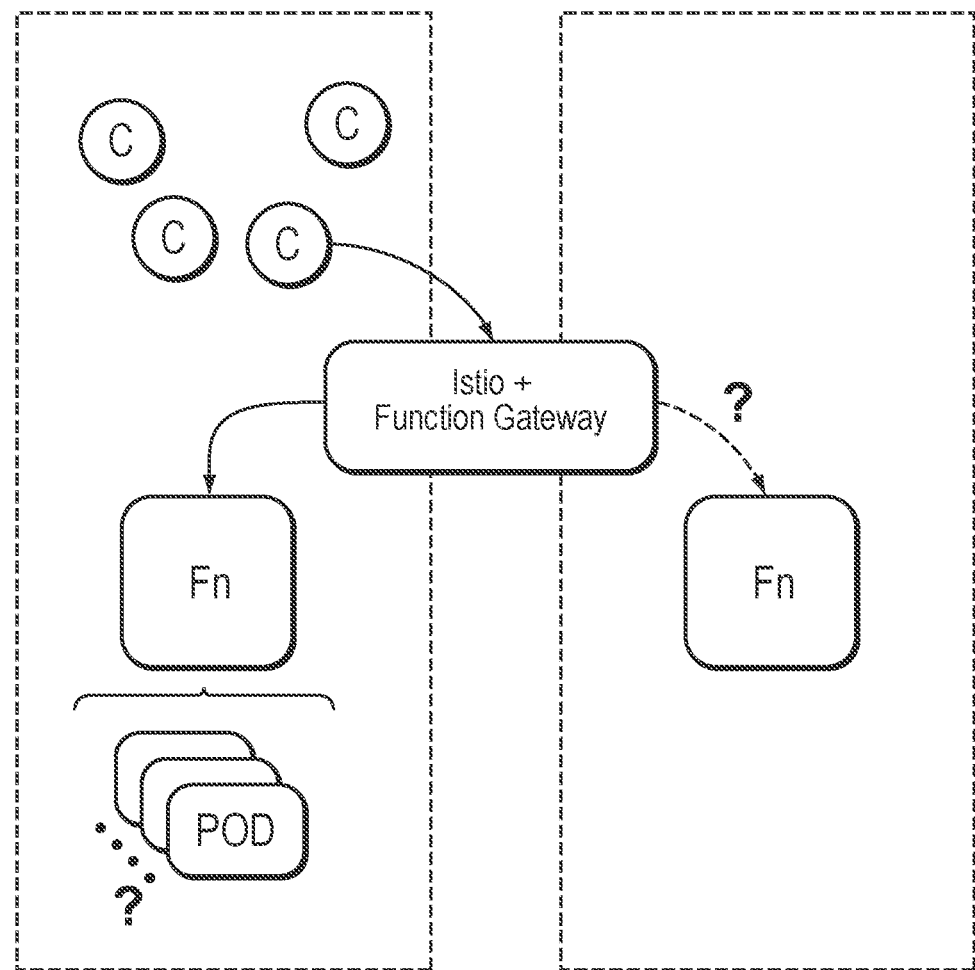
FIG. 5C schematically depicts implementation of Istio and a function gateway to provide a per-client route control and/or load distribution in accordance with various embodiments of the current invention.

Referring to FIG. 5C, in various embodiments, the management system 120 may utilize a combination of ISTIO and an API gateway (such as Kong) to provide "per-client" route control and/or load distribution. This may advantageously reduce the complexity and required time for facilitating traffic engineering for execution of multiple functions deployed by the same client.

Figure 6:
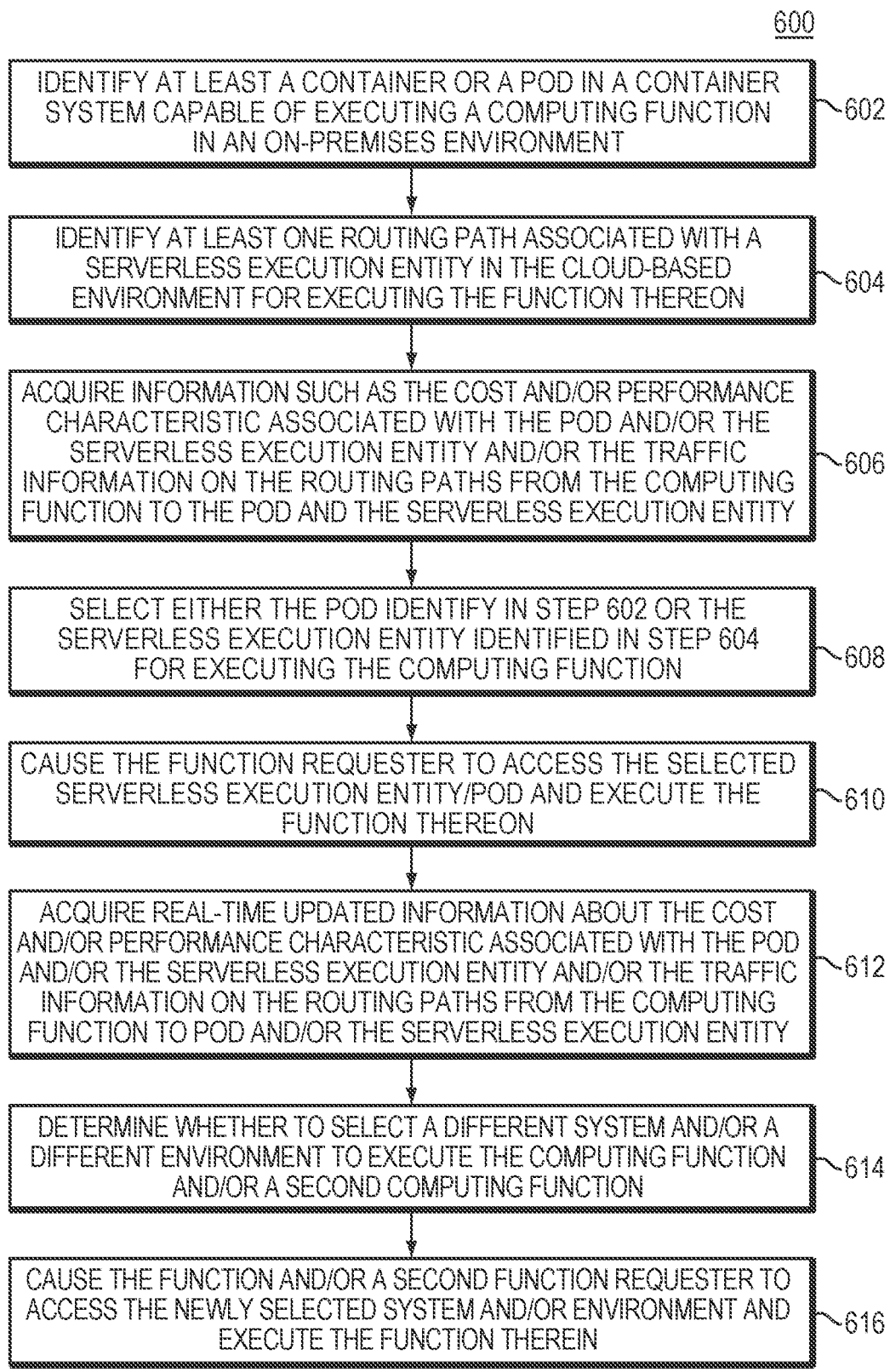
FIG. 6 is a flow chart illustrating an approach for facilitating traffic engineering for execution of a function in a computing application between an on-premises environment and a cloud-based environment or between a container system and a serverless service system both in the cloud-based environment in accordance with various embodiments of the present invention.

FIG. 6 is a flow chart illustrating a procedure 600 for facilitating traffic engineering for determining whether to execute a computing function in an on-premises environment or a cloud-based environment, or on a container system or a serverless service system (both in the cloud-based environment) in accordance with various embodiments. In a first step 602, the user and/or the management system 120 (e.g., the path-identifying module 146) may identify at least a container or a pod including a cluster of containers in a container system capable of executing the computing function in the on-premises environment or in the cloud-based environment. In a second step 604, the management system 120 (e.g., the path-identifying module 146) may identify at least one routing path associated with a serverless execution entity in the cloud-based environment for executing the function thereon. In a third step 606, the management system 120 (e.g., the information-acquisition module 148) may acquire information such as the cost and/or performance characteristic associated with the pod and/or the serverless execution entity, and/or traffic information on the routing paths from the computing function to the pod and to the serverless execution entity. In a fourth step 608, the management system 120 (e.g., the path-selection module 150) may select either the pod identified in step 602 or the serverless execution entity identified in step 604 for executing the computing function. The selection may be determined based on the information acquired in step 606. In a fifth step 610, the management system 120 (e.g., the recommendation module 152) may cause the computing function requester to access the selected serverless execution entity in the cloud-based environment or the pod in the on-premises environment (or, in some embodiments, in the cloud-based environment) to execute the function thereon. In various embodiments, while the function is executed by the selected pod or the serverless execution entity, the management system 120 (e.g., the information-acquisition module 148) may acquire real-time updated information about the cost and/or performance characteristic associated with the pod and/or the serverless execution entity and/or the traffic information on the routing paths from the computing function to pod and/or the serverless execution entity (step 612). Based at least in part on the updated information, the management system 120 (e.g., the path-selection module 150) may determine whether to select a different system (e.g., the container or the serverless execution entity) and/or a different environment (e.g., the on-premises environment or the cloud-based environment) to execute the computing function and/or a second computing function, different from the currently executed function, in the application (step 614). When a different system and/or environment is selected, the management system 120 (e.g., the recommendation module 152) may cause the computing function requester and/or the second function to access the function service in the newly selected system and/or environment and execute the function therein (step 616).

The approaches described above for routing traffic (i) from a serverless execution entity to a different serverless execution entity in the cloud-based environment, (ii) from a container/pod to a different container/pod in the on-premises or cloud-based environment, (iii) from a container/pod in the on-premises environment to a serverless execution entity in the cloud-based environment and/or (iv) from a container/pod in the cloud-based environment to a serverless execution entity in the cloud-based environment may be implemented to advantageously relieve the burden on an overloaded container/pod or a serverless execution entity. In contrast to the conventional approach where more containers/pods are added to scale up the cluster when the cluster is overloaded, the traffic-engineering approaches described above may provide a less-expensive solution.

In various embodiments, the management system 120 (e.g., the revenue and expense monitoring module 154) identifies one or more computational resources (e.g., a processor, a memory, a storage I/O resource, a network I/O resource and I/O pathways) associated with the serverless execution entity and/or pod for executing one or more functions thereon. In addition, the revenue and expense monitoring module 154 may maintain full accounting of revenues and costs for allocating the computational resource(s) and provides monitoring of these accounts and notifications upon certain accounting events. The revenue and expense monitoring module 154, by itself or with the assistance of an incorporated or separate return-on-investment (ROI) module (not shown), enables a user to monitor the ROI of the computational resource(s). The ROI is defined as revenue divided by cost, where revenue is the income from real and/or virtual payment collected by the consumer(s). Cost may be assigned in any suitable fashion; for example, the cost may be the out-of-pocket expense of using an external resource, or the fully loaded, attributed internal cost of using an on-premises resource. The cost may be measured in real currency (for out-of-pocket expenses) or virtual currency (for attributed internal costs). The revenue and expense monitoring module 154 may compute the revenue from each computational resource based on a unit price thereof and the quantity of the resource used by the consumer to execute a computing function. For example, suppose an ecommerce application capable of processing 100 transactions per second has a current utilization rate of 50%; in this case, the unit price may be set based on the 50% utilization or 50 transactions per second, and the requester may be charged this price times the number of transactions executed. Similarly, as noted above, the cost may include the amounts actually paid for the serverless execution entity/container to execute the computing function as well as the attributed cost including overhead of support by on on-premises equipment. The revenue and/or expense may be computed over a predetermined period of time (e.g., ten hours, ten days, one month, etc.). Further details about approaches to determining and monitoring the revenue and/or expense are provided, for example, in U.S. Pat. No. 10,346,775, the entire disclosure of which is hereby incorporated herein by reference.

In various embodiments, based on the monitored revenue and/or expense, the management system 120 (e.g., the function-sizing module 156) may determine the size associated with each of the computational resources allocated to the serverless execution entity/container for executing the computing function. For example, when the revenue and expense monitoring module 154 determines that the revenue (real and/or attributable) is larger than the expense (also real and/or attributable) for a predetermined factor (e.g., twice, five times or ten times), the function-sizing module 156 may increase the size associated with one or more computational resources allocated to the serverless execution entity/container in relation to the excess of revenue over expenses. Conversely, when the revenue and expense monitoring module 154 determines that the revenue is smaller than the expense for a predetermined factor (e.g., twice, five times or ten times), the function-sizing module 156 may decrease the size associated with one or more computational resources allocated to the serverless execution entity/container, e.g., by re-allocating those resources to perform other tasks (or, eventually, even decommissioning hardware).

In some embodiments, once the size associated with each computational resource allocated to the serverless execution entity/container for executing the computing function is determined, the management system (e.g., the resource-allocation module 158) may allocate the optimal available computational resources having the determined sizes to the serverless execution entity/container. For example, the resource-allocation module 158 may identify two or more resource providers for providing the necessary computational resources with the determined sizes to the serverless execution entity/container for executing the computing function; each of the resource providers may offer a purchase price. Based on the offered price, the resource-allocation module 158 may select the lowest price and automatically allocate the computer resources from the resource provider offering the lowest price to the serverless execution entity/container. In various embodiments, the resource-allocation module 158 may group the computational resources into multiple groups. For example, the CPUs may be grouped in the first group, and the memory and storage devices may be grouped in the second group. The resource-allocation module 158 may then select a resource provider (e.g., the one that offers the lowest price) for each group of resources and allocate each group of the resources provided by the selected provider to the serverless execution entity/container.

Figure 7:
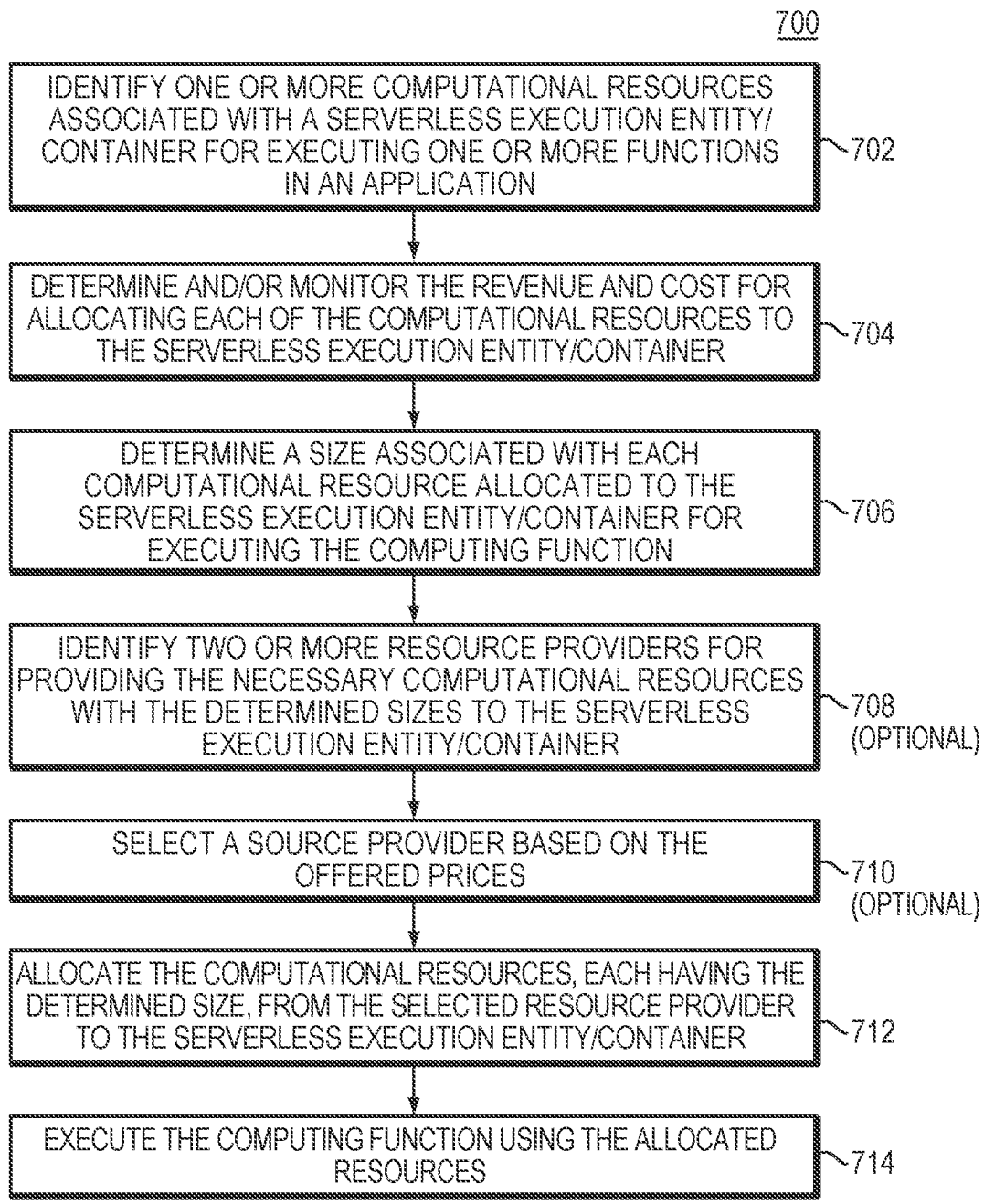
FIG. 7 is a flow chart illustrating an approach for determining sizes associated with computational resources and allocating the best available resources having the determined sizes to a serverless execution entity and/or pod for executing a computing function in accordance with various embodiments in accordance with various embodiments of the present invention.

FIG. 7 is a flow chart illustrating an approach 700 for determining sizes associated with computational resources and allocating the optimal available resources having the determined sizes to a serverless execution entity/container for executing a computing function in accordance with various embodiments. In a first step 702, the revenue and expense monitoring module 154 may identify one or more computational resources (e.g., a processor, a memory a storage I/O resource, a network I/O resource and I/O pathways) associated with a serverless execution entity/container for executing one or more functions in an application in response to a user's request. In a second step 704, the revenue and expense monitoring module 154 may determine and/or monitor the revenue and cost for allocating each of the computational resources to the serverless execution entity/container. In a third step 706, based on the determined/monitored revenue and expense, the function-sizing module 156 may determine a size associated with each computational resource allocated to the serverless execution entity/container for executing the computing function. Optionally, the resource-allocation module 158 may identify two or more resource providers for providing the necessary computational resources with the determined sizes to the serverless execution entity/container (step 708); each of the resource providers may offer a purchase price. Based on the offered price, the resource-allocation module 158 may select a resource provider (e.g., the one offering the lowest price adjusted for capabilities such as speed, terms of service, reliability, or other cost-adjusting metric) (step 710). Subsequently, the resource-allocation module 158 may allocate the computational resources, each having the determined size, from the selected resource provider to the serverless execution entity/container (step 712). The serverless execution entity/container may then execute the computing function as described above using the allocated resources (step 714).

Additionally or alternatively, the monitored revenue and/or expense may be used to (i) scale up or down the serverless execution entity/container, by adding or removing resources to existing components in the serverless execution entity/container, (ii) scale up the serverless execution entity/container, by adding more serverless execution entities/containers, or (iii) suspend or terminate the serverless execution entity/container. For example, when the revenue and expense monitoring module 154 determines that the ROI for a serverless execution entity/container exceeds a first upper predetermined threshold (e.g., 1), the resource-scaling module 160 may scale up the serverless execution entity/container. When the ROI exceeds a second upper predetermined threshold (e.g., 3) larger than the first upper threshold, the resource-scaling module 160 may scale up the serverless execution entity/container by introducing an additional serverless execution entity/container. In contrast, when the revenue and expense monitoring module 154 determines that the ROI for a serverless execution entity/container is below a first lower predetermined threshold (e.g., 0.7), the resource-scaling module 160 may scale down the serverless execution entity/container. When the ROI is further below a second lower predetermined threshold (e.g., 0.3) smaller than the first lower threshold, the resource-scaling module 160 may suspend or terminate the serverless execution entity/container.

Figure 8:
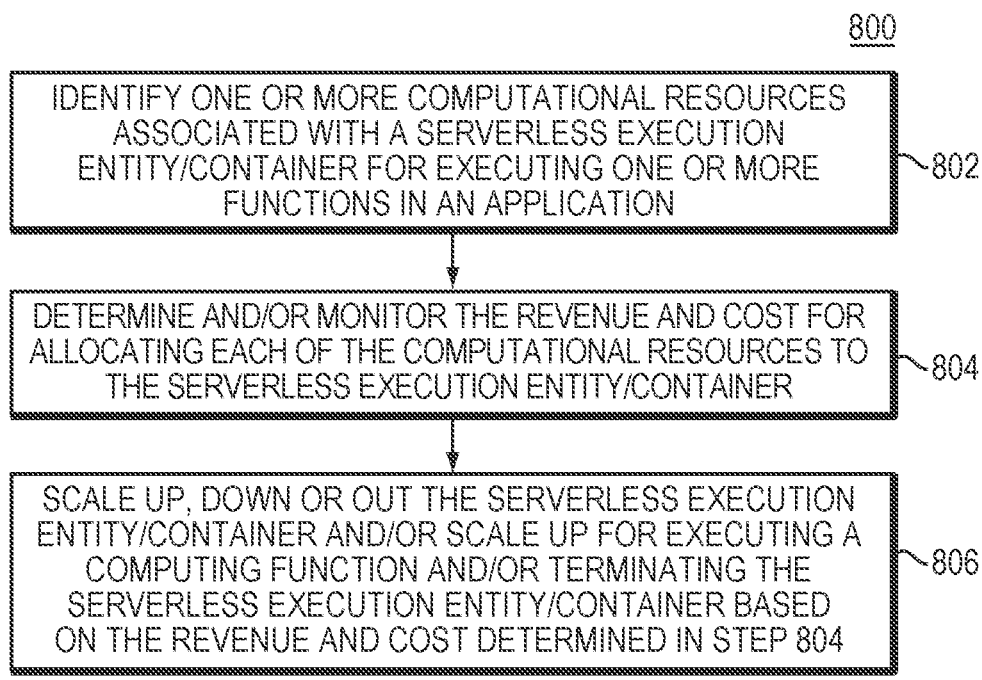
FIG. 8 is a flow chart illustrating an approach for scaling up, down or out and/or suspending or terminating the serverless execution entity/container executing a function in a computing application in accordance with various embodiments.

FIG. 8 is a flow chart illustrating an approach 800 for scaling up, down or out the serverless execution entity/container for executing a computing function and/or terminating the serverless execution entity/container in accordance with various embodiments. In a first step 802, the revenue and expense monitoring module 154 may identify one or more computational resources (e.g., a processor, a memory a storage I/O resource, a network I/O resource and I/O pathways) associated with a serverless execution entity/container for executing one or more functions in an application in response to a request. In a second step 804, the revenue and expense monitoring module 154 may determine and/or monitor the revenue and cost for allocating each of the computational resources to the serverless execution entity/container. In a third step 806, based on the monitored revenue and expense, the resource-scaling module 160 may scale up or down the serverless execution entity/container (e.g., by adding or removing resources to existing components in the serverless execution entity/container) or scale up the serverless execution entity/container (e.g., by adding more serverless execution entities/containers). Alternatively, the resource-scaling module 160 may suspend or terminate the serverless execution entity/container when, for example, ROI for the serverless execution entity/container is below the predetermined threshold.

In general, the modules including the path-identifying module 146, information-acquisition module 148, path-selection module 150, recommendation module 152, revenue and expense monitoring module 154, function-sizing module 156, resource-allocation module 158, and resource-scaling module 160 described above may be implemented in hardware, software, or a combination of both, whether integrated within the CPU 132, or provided by a separate external processor or other computational entity or entities.

In addition, the manager system 120 may include one or more additional modules implemented in hardware, software, or a combination of both to perform functionality described above. For embodiments in which the functions are provided as one or more software programs, the programs may be written in any of a number of high level languages such as PYTHON, FORTRAN, PASCAL, JAVA, C, C++, C#, BASIC, TENSORFLOW, THEANO, KERAS, PYTORCH, various scripting languages, and/or HTML. Additionally, the software can be implemented in an assembly language directed to the microprocessor resident on a target computer; for example, the software may be implemented in Intel 80x86 assembly language if it is configured to run on an IBM PC or PC clone. The software may be embodied on an article of manufacture including, but not limited to, a floppy disk, a jump drive, a hard disk, an optical disk, a magnetic tape, a PROM, an EPROM, EEPROM, field-programmable gate array, or CD-ROM. Embodiments using hardware circuitry may be implemented using, for example, one or more FPGA, CPLD or ASIC processors.

The terms and expressions employed herein are used as terms and expressions of description and not of limitation, and there is no intention, in the use of such terms and expressions, of excluding any equivalents of the features shown and described or portions thereof. In addition, having described certain embodiments of the invention, it will be apparent to those of ordinary skill in the art that other embodiments incorporating the concepts disclosed herein may be used without departing from the spirit and scope of the invention. Accordingly, the described embodiments are to be considered in all respects as only illustrative and not restrictive.

What is claimed is:

1. A method of allocating resources to an application comprising a plurality of application components, with at least one executing at least one function, in a serverless service architecture, the method comprising:
   (a) identifying a plurality of routing paths, each routing path being associated with a same function service provided by one or more containers or serverless execution entities;
   (b) determining traffic information on each routing path and/or at least one of a cost, a response time or a capacity associated with the one or more containers or serverless execution entities on each routing path;

(c) selecting one of the plurality of routing paths and its associated one or more containers or serverless execution entities based at least in part on the determination in step (b);

(d) causing a computational user of the application to access the one or more containers or serverless execution entities on the selected routing path and executing the at least one function thereon;

(e) updating (i) the determined traffic information on each routing path and/or (ii) the determined at least one of the cost, response time or capacity associated with the one or more containers or serverless execution entities on each routing path; and (f) based at least in part on (i) the updated traffic information and/or (ii) the updated cost, response time and/or capacity associated with the one or more containers or serverless execution entities on each routing path, determining whether to select a second routing path and cause the one or more containers or serverless execution entities associated with the second routing path, different from the selected routing path, to execute a second function, different from the at least one function.

2. The method of claim 1, further comprising:

(e) determining a transfer cost for the computational user of the application to access a second container or a second serverless execution entity on a second routing path, different from the one or more containers or serverless execution entities on the selected routing path, for executing the at least one function thereon; and (f) determining whether to cause the computational user of the application to access the second container or the second serverless execution entity on the second routing path and execute the at least one function thereon based at least in part on the transfer cost.

3. The method of claim 2, further comprising causing the computational user of the application to access the second container or the second serverless execution entity on the second routing path and execute the at least one function thereon in accordance with the determination in step (f).

4. The method of claim 1, further comprising:

updating information about the traffic information on each routing path and/or at least one of the cost, response time or capacity associated with the one or more containers or serverless execution entities on each routing path; and determining whether to select a second routing path, different from the selected routing path, to execute the at least one function based at least in part on the updated information.

5. The method of claim 1, wherein the at least one function comprises at least one of an AWS LAMBDA function, a Google cloud function, a Microsoft Azure function, an IBM OpenWhisk function, an Oracle Cloud function, or a Kubernetes-based Knative function.

6. The method of claim 1, wherein the one or more containers or serverless execution entities are implemented in a cloud-based environment.

7. The method of claim 1, wherein the one or more containers or serverless execution entities are implemented in an on-premises environment.

8. The method of claim 1, wherein the traffic information comprises at least one of a data flow rate, a bandwidth or a latency on each routing path.

9. The method of claim 8, wherein the selected routing path corresponds to at least one of a higher data flow rate, a broader bandwidth, a shorter latency, or being associated with the container or serverless execution entity having a lower data-transfer cost, a faster response time or a larger capacity compared to unselected routing paths.

10. A computer system for allocating resources to an application comprising a plurality of application components, having at least one executing a function, in a serverless service architecture, the computer system comprising a management system configured to:

(a) identify a plurality of routing paths, each routing path being associated with a same function executed by one or more containers or serverless execution entities;

(b) determine traffic information on each routing path and/or at least one of a cost, a response time or a capacity associated with the one or more containers or serverless execution entities on each routing path;

(c) select one of the plurality of routing paths and its associated one or more containers or serverless execution entities based at least in part on the determination in step (b);

(d) cause a computational user of the application to access the one or more containers or serverless execution entities on the selected routing path and execute the at least one function thereon;

(e) update (i) the determined traffic information on each routing path and/or (ii) the determined at least one of the cost, response time or capacity associated with the one or more containers or serverless execution entities on each routing path; and (f) based at least in part on (i) the updated traffic information and/or (ii) the updated cost, response time and/or capacity associated with the one or more containers or serverless execution entities on each routing path, determine whether to select a second routing path and cause the one or more containers or serverless execution entities associated with the second routing path, different from the selected routing path, to execute a second function, different from the at least one function.

11. The computer system of claim 10, further comprising a processor, a storage I/O resource, a network I/O resource and I/O pathways.

12. A method of allocating resources to an application comprising a plurality of application components for executing a plurality of functions in a serverless service architecture, the method comprising:

(a) identifying a plurality of routing paths, each routing path being associated with one or more containers or serverless execution entities;

(b) determining traffic information on each routing path and/or at least one of a cost, a response time or a capacity associated with the one or more containers or serverless execution entities on each routing path;

(c) selecting, for each of the functions, one of the plurality of routing paths and its associated one or more containers or serverless execution entities based at least in part on the determination in step (b);

(d) causing a computational user of the application to access the containers or serverless execution entities corresponding to the selected routing paths for executing the corresponding functions thereon;

(e) updating (i) the determined traffic information on each routing path and/or (ii) the determined at least one of the cost, response time or capacity associated with the one or more containers or serverless execution entities on each routing path; and (f) determining, for each of the functions, whether to select a second routing path, different from the corresponding selected routing path, to execute the corresponding function based at least in part on (i) the updated traffic information on each routing path and/or (ii) the updated cost, response time and/or capacity associated with the one or more containers or serverless execution entities on each routing path.

13. The method of claim 12, further comprising causing the computational user of the application to access a second container or a second serverless execution entity on the second routing path and execute the corresponding function thereon in accordance with the determination in step (f).

14. The method of claim 12, wherein the traffic information comprises at least one of a data flow rate, a bandwidth or a latency on each routing path.

15. The method of claim 12, wherein the at least function comprises at least one of an AWS LAMBDA function, a Google cloud function, a Microsoft Azure function, an IBM OpenWhisk function, an Oracle Cloud function, or a Kubernetes-based Knative function.

16. The method of claim 12, wherein the one or more containers or serverless execution entities are implemented in a cloud-based environment.

17. The method of claim 12, wherein the one or more containers or serverless execution entities are implemented in an on-premises environment.

18. A computer system for allocating resources to an application comprising a plurality of application components for executing a plurality of functions in a serverless service architecture, the computer system comprising a management system configured to:
   (a) identify a plurality of routing paths, each routing path being associated with one or more containers or serverless execution entities;
   (b) determine traffic information on each routing path and/or at least one of a cost, a response time or a capacity associated with the one or more containers or serverless execution entities on each routing path;
   (c) select, for each of the functions, one of the plurality of routing paths and its associated one or more containers or serverless execution entities;
   (d) cause a computational user of the application to access the containers or serverless execution entities corresponding to the selected routing paths for executing the corresponding functions thereon
   (e) update (i) the determined traffic information on each routing path and/or (ii) the determined at least one of the cost, response time or capacity associated with the one or more containers or serverless execution entities on each routing path; and
   (f) determine, for each of the functions, whether to select a second routing path, different from the corresponding selected routing path, to execute the corresponding function based at least in part on (i) the updated traffic information on each routing path and/or (ii) the updated cost, response time and/or capacity associated with the one or more containers or serverless execution entities on each routing path.

19. The computer system of claim 10, wherein the management system is further configured to:
   (e) determine a transfer cost for the computational user of the application to access a second container or a second serverless execution entity on a second routing path, different from the one or more containers or serverless execution entities on the selected routing path, for executing the at least one function thereon; and
   (f) determine whether to cause the computational user of the application to access the second container or the second serverless execution entity on the second routing path and execute the at least one function thereon based at least in part on the transfer cost.

20. The method of claim 12, further comprising:
   (e) determining, for each of the functions, a transfer cost for the computational user of the application to access a second container or a second serverless execution entity on a second routing path, different from the one or more containers or serverless execution entities on the selected routing path, for executing the corresponding function thereon; and
   (f) determining, for each of the functions, whether to cause the computational user of the application to access the second container or the second serverless execution entity on the second routing path and execute the corresponding function thereon based at least in part on the transfer cost.

21. The computer system of claim 18, wherein the management system is further configured to:
   (e) determine, for each of the functions, a transfer cost for the computational user of the application to access a second container or a second serverless execution entity on a second routing path, different from the one or more containers or serverless execution entities on the selected routing path, for executing the corresponding function thereon; and
   (f) determine, for each of the functions, whether to cause the computational user of the application to access the second container or the second serverless execution entity on the second routing path and execute the corresponding function thereon based at least in part on the transfer cost.

* * * * *